United States Patent

Hardin et al.

(10) Patent No.: US 7,208,720 B2
(45) Date of Patent: Apr. 24, 2007

(54) INTRUSION DETECTION SYSTEM

(75) Inventors: Larry C. Hardin, 960 Ocean Dr., Bandon, OR (US) 97411; Lawrence V. Nash, Gold Beach, OR (US)

(73) Assignee: Larry C. Hardin, Bandon, OR (US)

( * ) Notice: Subject to any disclaimer, the term of this patent is extended or adjusted under 35 U.S.C. 154(b) by 44 days.

(21) Appl. No.: 10/750,469

(22) Filed: Dec. 31, 2003

(65) Prior Publication Data

US 2004/0169131 A1 Sep. 2, 2004

Related U.S. Application Data

(63) Continuation-in-part of application No. 09/348,903, filed on Jul. 6, 1999, now Pat. No. 6,675,121.

(51) Int. Cl.
*G01C 3/08* (2006.01)

(52) U.S. Cl. ............... 250/221; 356/3.14; 348/153; 348/154

(58) Field of Classification Search ........... 250/221, 250/222.1; 340/555–557, 541, 567; 356/3.14; 348/152–155

See application file for complete search history.

(56) References Cited

U.S. PATENT DOCUMENTS

| 3,811,010 | A | * | 5/1974 | Long | ............... | 348/154 |
|---|---|---|---|---|---|---|
| 5,045,702 | A | * | 9/1991 | Mulleer | ............... | 250/342 |
| 5,500,525 | A | * | 3/1996 | Saban | ............... | 250/221 |
| 5,586,063 | A | * | 12/1996 | Hardin et al. | ............... | 702/142 |
| 5,602,944 | A | * | 2/1997 | Yokoyama et al. | ............... | 382/278 |
| 6,853,738 | B1 | * | 2/2005 | Nishigaki et al. | ............... | 382/106 |

* cited by examiner

*Primary Examiner*—Que Tan Le
*Assistant Examiner*—Stephen Yam
(74) *Attorney, Agent, or Firm*—Chernoff, Vilhauer, McClung & Stenzel, LLP

(57) ABSTRACT

An intrusion detection system comprises a pair of optical lenses arranged a predetermined distance apart and having overlapping fields of view within an area to be monitored to form a common field of view; at least one light-sensitive device responsive to light from each of the optical lenses; a range detector responsive to signals from the light-sensitive device and operable to determine a range to an object within the common field of view; and a range discriminator for setting at least one range gate to sense objects within the common field of view at predetermined ranges and for ignoring objects outside of the predetermined ranges.

11 Claims, 24 Drawing Sheets

COMPUTE THE VIDEO LINE
NUMBER FOR A DESIRED MAX
DETECTION RANGE AND
RANGE GATE SETTINGS

START (FIG.21) INPUT SYSTEM PARAMETERS:
- OBJECT HEIGHT ($h_o$)
- SENSOR HEIGHT ($h_s$)
- FOCAL LENGTH (f)
- SENSOR DEPRESSION ANGLE ($\alpha$)
- VIDEO CAMERA CHIP VERTICAL ACTIVE DIMENSION ($h_c$)
- NUMBER OF VIDEO LINES IN THE CHIP ($N_L$) ~100

(FIG.21) SELECT A NOMINAL MAXIMUM RANGE ($R_L$) ~102

(FIG.21) COMPUTE ANGLE BETWEEN VIDEO LINE LOS AND THE LOCAL VERTICAL ($\phi_L$):

$$\phi_L = TAN^{-1} \frac{h_c}{h_s}$$

~104

(FIG.21) COMPUTE ANGLE BETWEEN SENSOR LOS AND LOS OF SELECTED LINE ($\Delta\Theta$):

$$\Delta\Theta = ABS(\phi_L + \alpha - 90°)$$

WHERE ABS IS THE ABSOLUTE VALUE OPERATOR

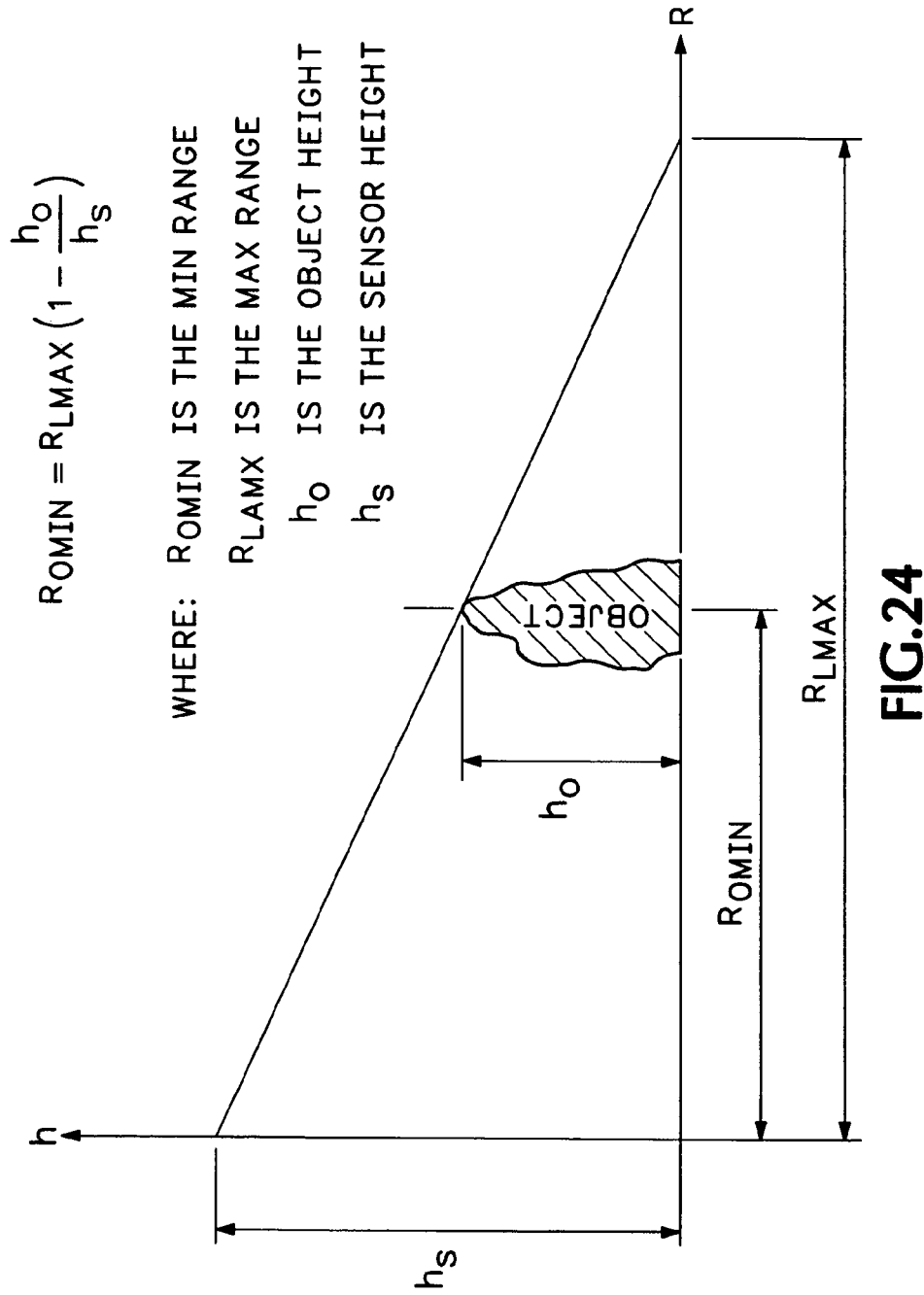

INTRUSION DETECTION SYSTEM

CROSS-REFERENCE TO RELATED APPLICATIONS

This application is a continuation-in-part of application Ser. No. 09/348,903 filed Jul. 6, 1999 now U.S. Pat. No. 6,675,121.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Security systems frequently employ combinations of video monitoring and/or motion detectors which sense intrusion into an area. The former requires real-time surveillance by an operator while the latter is subject to frequent false alarm conditions.

U.S. Pat. No. 5,586,063 to Hardin et al., which is assigned to the assignee of this application and is incorporated herein by reference, is directed to a passive optical speed and distance measuring system (the '063 system). Specifically the '063 system includes a pair of camera lenses positioned along a common baseline a predetermined distance apart and controlled by an operator to capture images of a target at different times. The camera lenses are focused on light sensitive pixel arrays that capture target images at offset positions in the line scans of the pixel arrays. A video signal processor with a computer determines the location of the offset positions and calculates the range to the target by solving the trigonometry of the triangle formed by the two camera lenses and the target.

With such a system, objects moving into the field of view of the video cameras may be monitored. Further if not only range but direction and velocity were known, objects of interest could be tracked and others ignored. To some degree, this would alleviate the problem of false alarms.

BRIEF SUMMARY OF THE INVENTION

An intrusion detection system comprises a pair of optical lenses arranged a predetermined distance apart and having overlapping fields of view within an area to be monitored to form a common field of view; at least one light-sensitive device responsive to light from each of the optical lenses; a range detector responsive to signals from the light-sensitive device and operable to determine a range to an object within the common field of view; and a range discriminator for setting at least one range gate to sense objects within the common field of view at predetermined ranges and for ignoring objects outside of the predetermined ranges.

The foregoing and other objectives, features and advantages of the invention will be more readily understood upon consideration of the following detailed description, taken in conjunction with the accompanying drawings.

BRIEF DESCRIPTION OF THE SEVERAL DRAWINGS

FIGS. 20A, 20B, 20C and 20D are flow-chart diagrams illustrating the range gate setting feature of the intrusion detection system.

FIG. 24 is a geometrical line drawing illustrating minimum range of a selected line of pixels in a light-sensitive device as a function of object height.

DETAILED DESCRIPTION OF THE INVENTION

Figure 1:
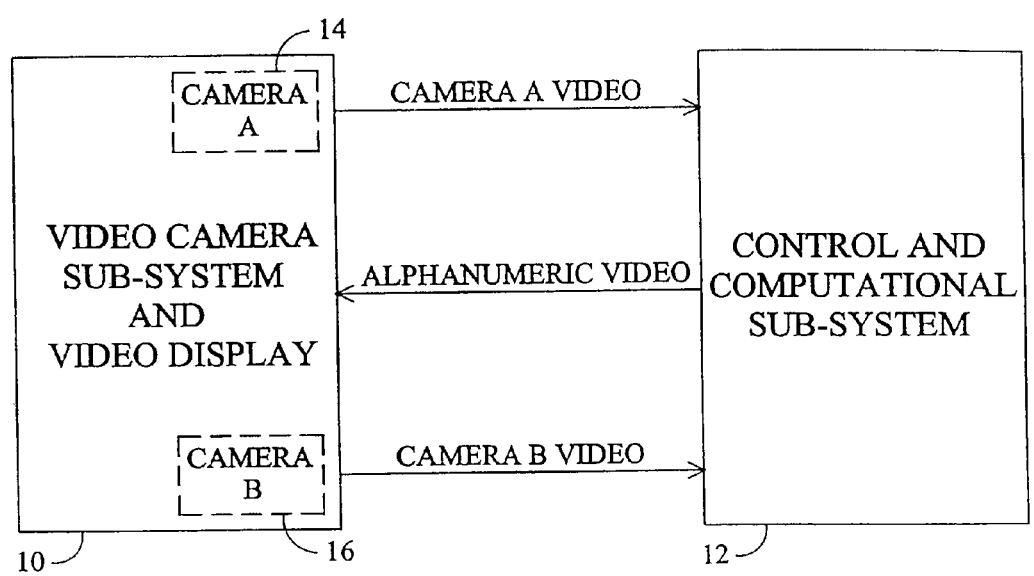
FIG. 1 is a simplified block schematic diagram of the system of the invention.

Referring to FIG. 1, the present invention includes a video camera subsystem and video display 10 connected to a control and computational subsystem 12. The camera subsystem 10 provides camera video from cameras A and B 14, 16 to the control and computational subsystem 12. The control subsystem supplies alphanumeric video to the video display subsystem 10. Cameras A and B 14, 16 may be any type of electro-optical imaging sensors with a focal length f. Each imaging sensor can be, for example, a charge-coupled device (CCD), a charge-injection device (CID), a metal-oxide-semiconductor (MOS) phototransistor array or various types of infra-red imaging sensors, one example of which is a Platinum Silicide (PtSi) detector array. Control and computational subsystem 12 may be any type of computer. For example, the computational subsystem 12 may be that shown in FIG. 11, a general purpose computer with special software, or an alternate computer specifically designed to accomplish the functions described herein.

Figure 2A:
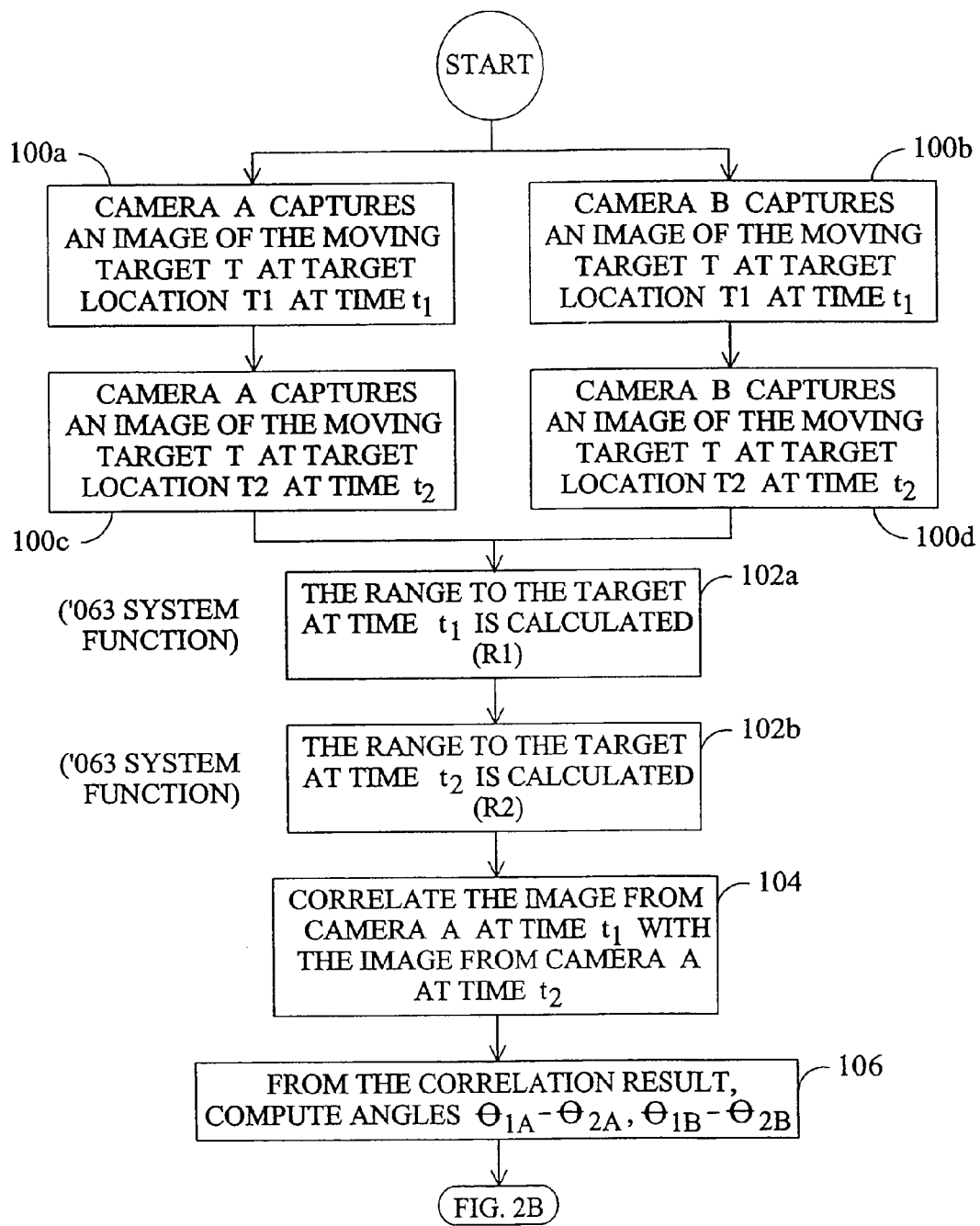
FIG. 2 is a simplified flow chart diagram of a preferred embodiment of the present invention.
Figure 2B:
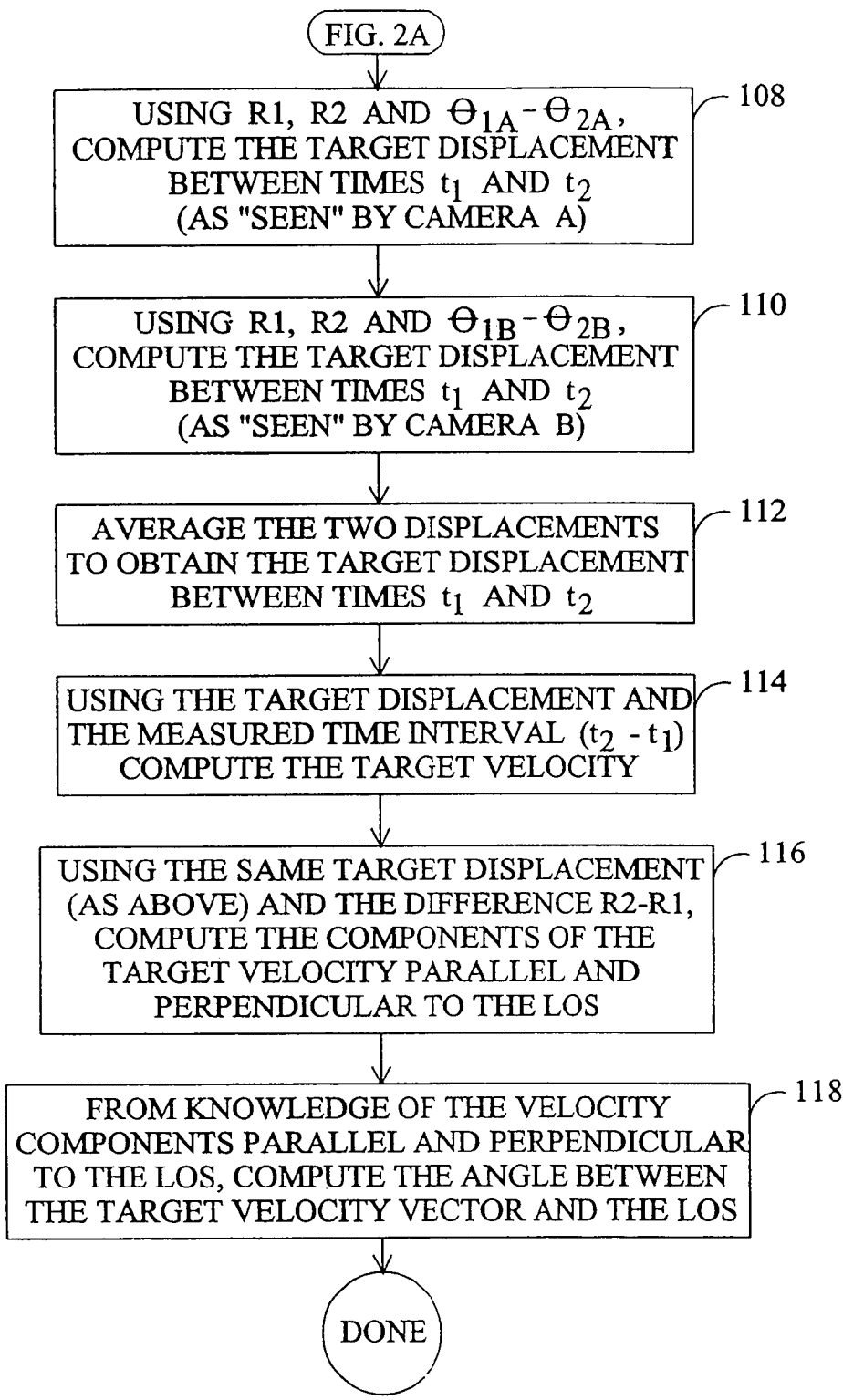

More specifically, as shown in FIG. 2, each of the cameras 14, 16 in the camera subsystem 10, when instructed by the control subsystem 12, take a video image or linear scan of moving target T at a first instance $t_1$ and at a second instance $t_2$ (for a total of four recorded images) 100a–100d. The target is at location $T_1$ at the first instance $t_1$ and at location $T_2$ at the second instance. The camera subsystem 10 then passes the camera video to the computational subsystem 12 that makes the calculations necessary to determine the range of the target T at time instance $t_1$ 102a and the range $R_2$ of the target T at time instance $t_2$ 102b. As will be discussed below in detail, the ranges $R_1$ and $R_2$ to target T at both time instances $t_1$ and $t_2$ are obtained by correlating the images obtained from both cameras at that time. The image from camera A at time $t_1$ is then correlated with the image from camera A at time $t_2$ 104. From the correlation result, the angles $\theta_{1A}-\theta_{2A}$ and $\theta_{1B}-\theta_{2B}$ can be calculated 106. Using $R_1$, $R_2$, and the angle $\theta_{1A}-\theta_{2A}$, the target displacement between times $t_1$ and $t_2$ as seen by camera A 108 can be calculated. Using $R_1$, $R_2$ and the angle $\theta_{1B}-\theta_{2B}$, the target displacement between times $t_1$ and $t_2$ as seen by camera B can be calculated 110. The two displacements are then averaged to obtain the target displacement between times $t_1$ and $t_2$ 112. Then, the total target velocity V is calculated using the target displacement and the measured time interval $(t_2-t_1)$ 114. Using the target displacement and the difference $R_1-R_2$, the components of the total target velocity parallel $V_x$ and perpendicular $V_y$ to the line-of-sight can be computed 116. Finally, from the knowledge of the velocity components parallel and perpendicular to the line-of-sight, the angle between the total target velocity vector and the line-of-sight can be computed 118.

It should be noted that knowledge of the total target displacement $\delta_R$ and the time instance interval $(t_2-t_1)$ enables computation of the velocity of the target as well as the components $X_R$ and $Y_R$ of the displacement vector $\delta_R$. It should also be noted that the order of computations shown in FIG. 2 is meant to be exemplary and may be varied without changing the scope of the invention.

Figure 3:
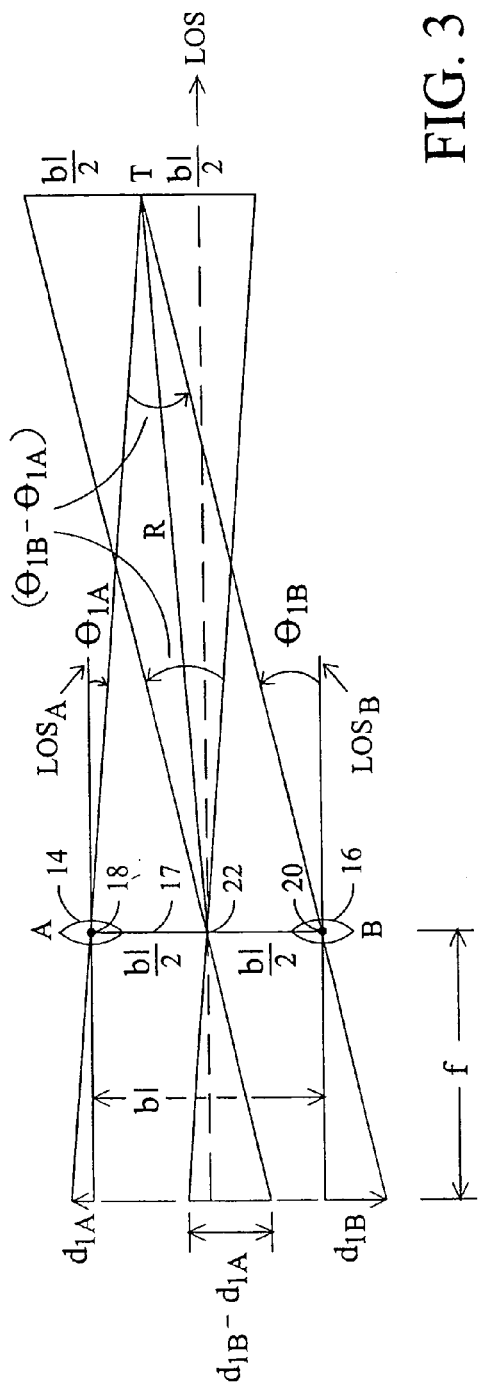
FIG. 3 is a schematic illustration of the electro-optical relationships of the system used for generating a range measurement.

Turning first to the exemplary computation of range R, FIG. 3 shows an optical schematic diagram illustrating the placement of cameras A and B 14, 16 used in the method for measuring of the range R or distance from the center of a baseline 17 to the target T. The method for measuring range R, the first step in the method of the present invention, is substantially the same method as that used in the '063 system. Calculating R would be done twice in the method of the present invention: once for calculating $R_1$ (the distance from the baseline midpoint 22 to the target at location $T_1$) and once for calculating $R_2$ (the distance from the baseline midpoint 22 to the target at location $T_2$). $R_1$ and $R_2$ will be used as approximations for $R_{1A}$, $R_{1B}$, $R_{2A}$, and $R_{2B}$ as set forth below.

Both the '063 system and the present invention, as shown in FIG. 3, include a camera A 14 positioned at a first position 18 and a camera B 16 positioned at a second position 20 on a baseline 17. In these positions, the cameras are separated by a distance of b1 and have lines-of-sight LOS that are parallel and in the same plane. Range R, as measured by this method, is defined as the distance from the midpoint 22 of the baseline 17 to the exemplary target T. LOS is the line-of-sight of the two-sensor system. LOSA and LOSB are the lines-of-sight for cameras A and B 14, 16, respectively. LOS intersects baseline 17 at its midpoint 22, is in the same plane as the cameras' lines-of-sight, and is perpendicular to baseline 17. The angle shown as θ1A is the angle between LOSA and the target T and the angle shown as θ1B is the angle between LOSB and the target T. Using the image information supplied by the video camera sub-system 10, the control and computational sub-system 12 first determines the angle of interest (θ1B−θ1A) by electronically correlating the images from the focal planes of cameras A and B 14, 16 to measure the linear displacement d1B−d1A. The magnitude of d1B−d1A can be measured by correlating the A and B camera images obtained at time t1. d1B−d1A is measured at the focal plane which is behind the baseline by a distance f, the focal length.

Figure 4:
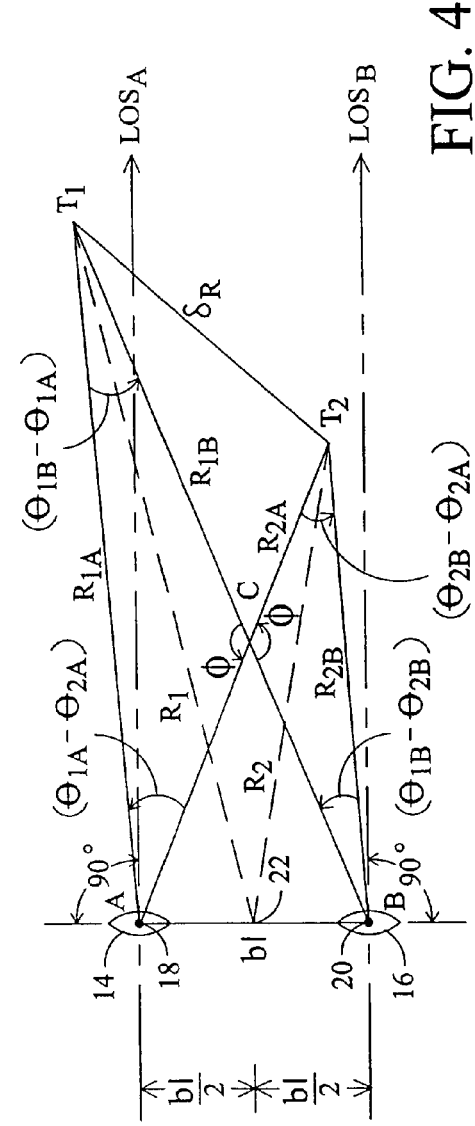
FIG. 4 is a schematic illustration of the electro-optical relationships of the system used for generating a velocity measurement.

Image correlation is possible in the present invention because the system geometry (as shown in FIGS. 3 and 4) is such that a portion of the image from camera A 14 will contain information very similar to that contained in a portion of the image from camera B 16 when both images are acquired at the same time. This common information occurs in a different location in the camera A image when compared to its location in the camera B image due to the separation of the two cameras by the baseline distance b1.

Figure 5:
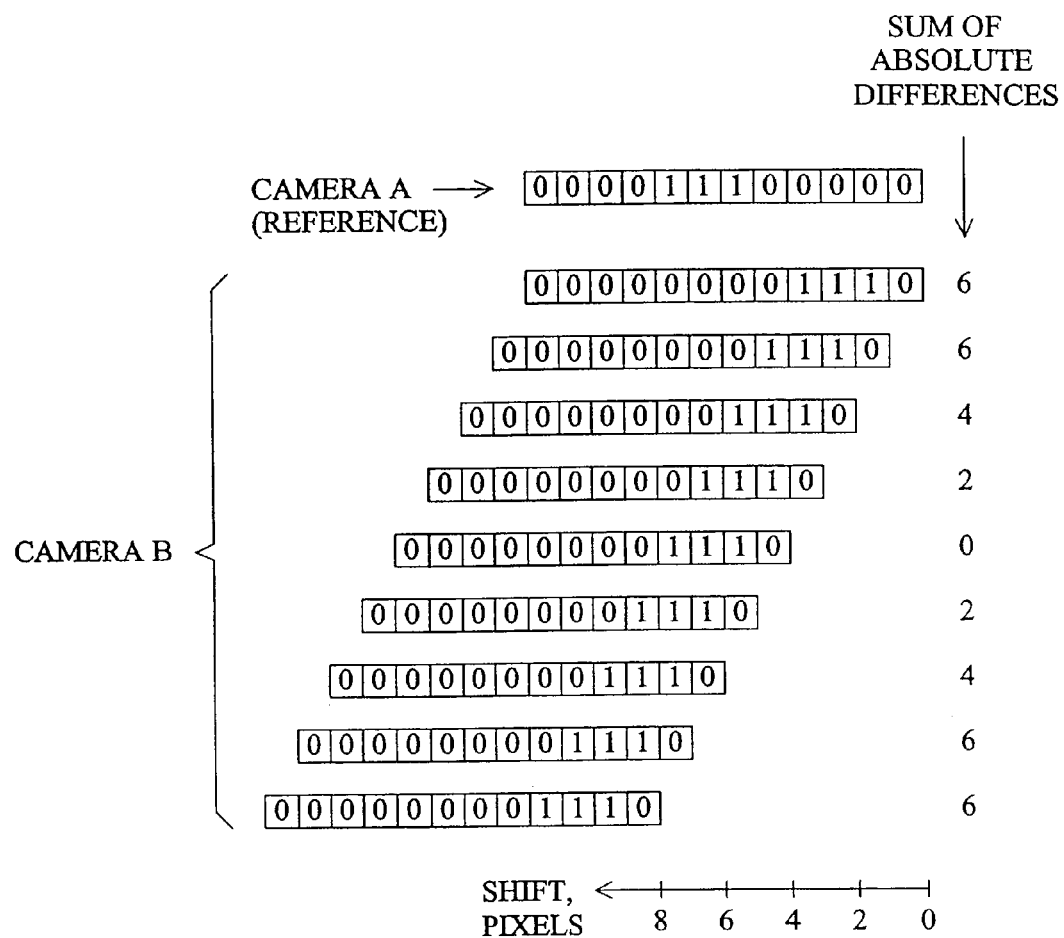
FIG. 5 is a schematic illustration of a simplified hypothetical example of the correlation process.
Figure 6:
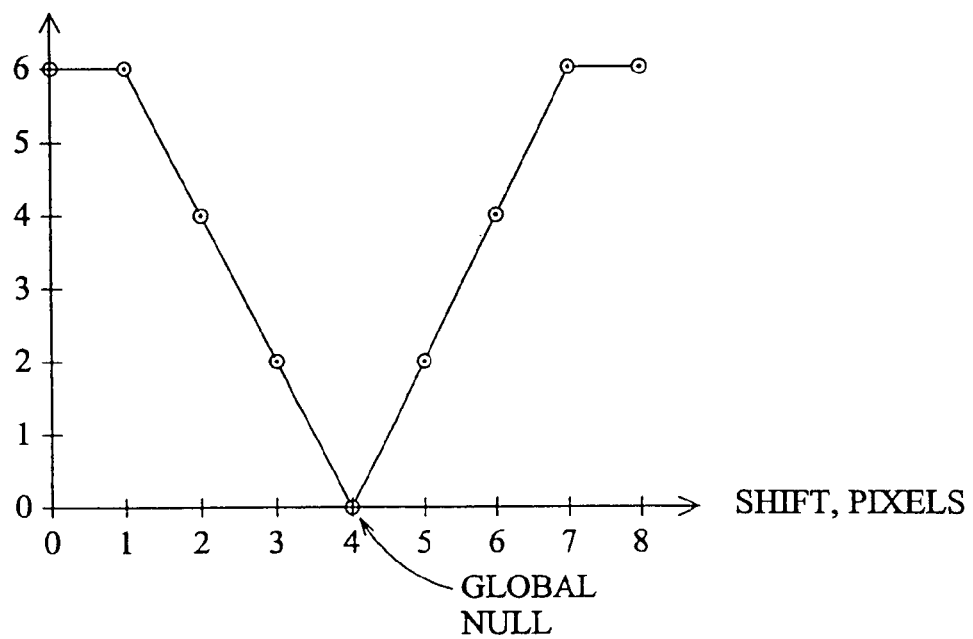
FIG. 6 is a null curve diagram illustrating an exemplary relationship between the shift in pixels (x-axis) and the sum of the absolute differences (y-axis).

The correlation process is discussed in U.S. Pat. No. 5,586,063 to Hardin et al., which is assigned to the assignee of this application and is incorporated herein by reference. However, FIGS. 3 and 4 may be used to illustrate this process. FIG. 5 illustrates the correlation of two linear images, one from Camera A, the other from Camera B. For simplicity, a hypothetical video line of 12 pixels is shown. (In practice, cameras with video line-lengths of hundreds of pixels are used.) In addition, for simplicity of illustration, a single 3 pixel-wide image of unit (I) intensity is shown, with a uniform background of zero intensity. In practice, any pixel can have any value within the dynamic range of the camera. The pixel values for each of the two video lines are mapped in computer memory. In this case, the Camera A line is used as the reference. The map for the Camera B line is then matched with the A line map at different offsets from zero pixels to some maximum value dictated by other system parameters. (Zero pixels offset corresponds to a range of infinity.) This unidirectional process is sufficient since the relative position of any target in the FOV of one camera with respect to the other is known. At each offset position the absolute difference is computed for each adjacent pixel-pair that exists (the pixels in the overlap region). The differences are then summed. It should be noted that there are a number of other mathematical procedures that could be used to correlate the lines that would achieve similar results. One advantage of the procedure described is that no multiplication (or division) operations are required. (Addition and subtraction are computationally less intensive.) FIG. 6 is a plot of the sum of absolute differences (y-axis) versus the offset for this example. Note that the function has a minimum at the point of best correlation. This is referred to as the "global null," "global" differentiating it from other shallower nulls that can result in practice. The offset value corresponding to the global null is shown in FIG. 6 as d1B-d1A. This quantity is also shown in FIG. 3.

In order to measure the total displacement of the target (in order to compute the total velocity) at least one more correlation is required. The additional correlation is performed in a similar manner to that described above, but is a temporal correlation. It uses images from the same camera (Camera A), obtained at two different times (t1 and t2). One difference is that the relative positions of the target image at the two different times is not known to the System. This requires that the correlation be bi-directional. Bi-directional correlation is achieved by first using the t1 image map as the reference and shifting the t2 image map, then swapping the image maps and repeating the process.

Once image correlation has been completed, the angle ($\theta$1B-$\theta$1A) can be found from the equation: $\theta$1B-$\theta$1A=arctan [(d1B-d1A)/f]. Using this information, range R is calculated by the equation: R=b1/[2 tan ½($\theta$1B-$\theta$1A)]. Alternatively, the computational sub-system 12 can find range R by solving the proportionality equation: (d1B-d1A)/f=(b1/2)/R. The method for finding R is set forth in more complete terms in U.S. Pat. No. 5,586,063, however, alternative methods for computing range may be used.

FIG. 4 is an optical schematic diagram of the placement of cameras A and B 14, 16 as well as the angles and distances used in the method for measuring of the velocity v, the second step in the method of the present invention. To make the necessary calculations to find the velocity v, first the target displacement ($\delta$R) between the target location (T1) at a first instance (t1) and the target location(T2) at a second instance (t2) must be determined. Once $\delta$R is determined, the velocity (v) is computed as: v=$\delta$R/(t2-t1). It should be noted that the '063 system can compute only the ranges R1 and R2 which, when differenced (to form R2-R1), constitute only one component of the total displacement $\delta$R.

To find an accurate $\delta$R, both triangle A (defined by camera A lens 14 at position 18 on the baseline 17, the target location T1 at the first instance t1, and the target location T2 at the second instance t2) and triangle B (defined by camera B lens 16 at position 20 on the baseline 17, the target location T1 at the first instance t1, and the target location T2 at the second instance t2) should be solved. By solving triangle A to find $\delta$RA, an approximate of $\delta$R is found. Solving for $\delta$RB and averaging it with $\delta$RA ($\delta$R=($\delta$RA+$\delta$RB)/2) greatly reduces error in using a single calculation. It should be noted that images of the target acquired by cameras A and B at times t1 and t2 may have already been acquired and stored for use in range computations of the '063 system.

Figure 7:
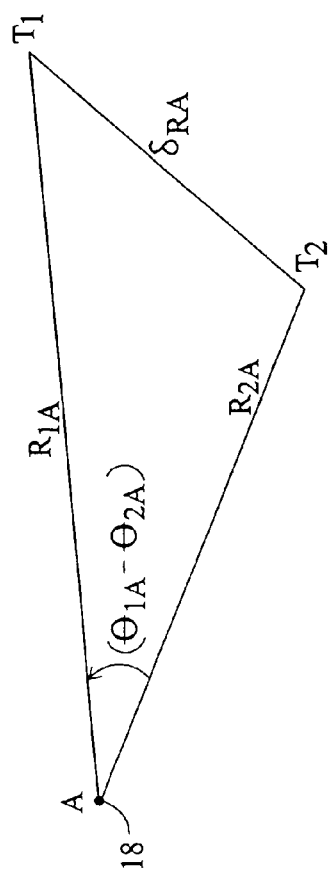
FIG. 7 is a simplified schematic illustration depicting the angular relationships between camera A and the target T at times t1 and t2.

FIG. 7 shows an enhanced view of triangle A (defined by camera A lens 14 at position 18 on the baseline 17, the target location T1 at the first instance t1, and the target location T2 at the second instance t2). Specifically, the angle $\theta$1A-$\theta$2A is the angular difference between target locations T1 and T2, as measured by camera A. The images are acquired by camera A at times t1 and t2, as set forth above, and are then correlated to obtain the angle $\theta$1A-$\theta$2A. The next step is to use R1 and R2 as approximations for R1A and R2A respectively. R1 and R2 can be calculated using the equations set forth generally above and in detail in U.S. Pat. No. 5,586,063, incorporated herein by reference. Using these calculations, triangle A can be solved for the displacement $\delta$RA, using the law of cosines: $\delta$RA=[R12+R22-2R1R2 cos ($\theta$1A-$\theta$2A)]½.

Figure 8:
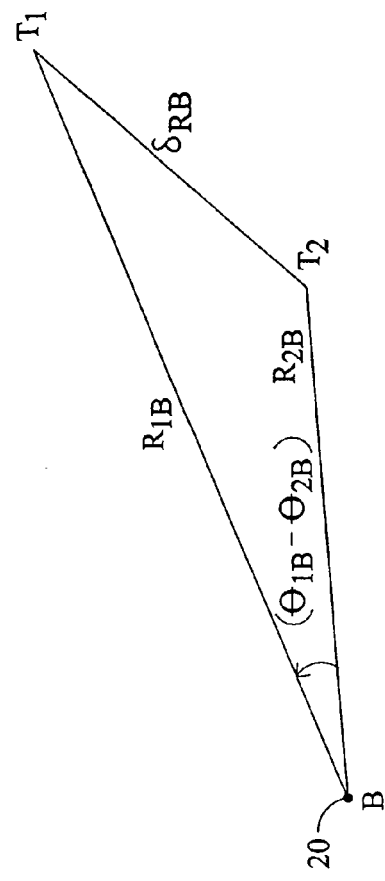
FIG. 8 is a simplified schematic illustration depicting the angular relationships between camera B and the target T at times t1 and t2.

$\delta$RA is slightly different than the desired $\delta$R (of FIG. 4) because R1 and R2 are distances from the midpoint 22 of the baseline to target locations T1 and T2, whereas R1A and R2A are distances from camera A to target locations T1 and T2. Using the built in symmetry of the system, this error can be greatly reduced by solving triangle B (defined by camera B lens 16 at position 20 on the baseline, the target location T1 at the first instance t1, and the target location T2 at the second instance t2) of FIG. 8 for $\delta$RB and averaging the two results. $\delta$RB may be found using calculations similar to those set forth above for triangle A. Specifically, triangle B can be solved for the displacement $\delta$RB, using the law of cosines: $\delta$RB=[R12+R22-2R1R2 cos ($\theta$1B-$\theta$2B)]½.

It should be noted that the solution of triangle B does not require a correlation operation (as did the solution of triangle A) to determine the angle $\theta$1B-$\theta$2B. The reason for this can be seen by referring to FIG. 4 where it can be seen that the triangles A, C, T1 and B, C, T2 both contain the same angle $\omega$ (from the law that opposite angles are equal). C is the point of intersection between R1B, the range from camera B to the target at the first instance, and R2A, the range from camera A to the target at the second instance.) Thus, since three of the four difference angles shown are known, the fourth can be computed using the law that the sum of the interior angles of a triangle is always equal to 180 degrees. Correlation using the images from camera B 16 may be performed for the optional purpose of verifying optical alignment.

As set forth above, once $\delta$R is determined, the velocity v of target T is computed as: v=$\delta$R/(t2-t1). The time base 12a and sync generator 12b (FIG. 11) would provide the elements necessary to compute t1 and t2.

The next step of the present invention is to compute the parallel component $X_R$ of the displacement vector $\delta_R$ and the perpendicular component $Y_R$ of the displacement vector $\delta_R$. Component $X_R$ of the displacement vector is parallel to the LOS in the plane defined by the LOS and the baseline 17. Component $Y_R$ of the displacement vector is perpendicular to the LOS in the plane defined by the LOS and the baseline 17. The velocity vector components are determined by dividing the displacement vector component values by the time interval over which the displacement occurred.

Figure 9:
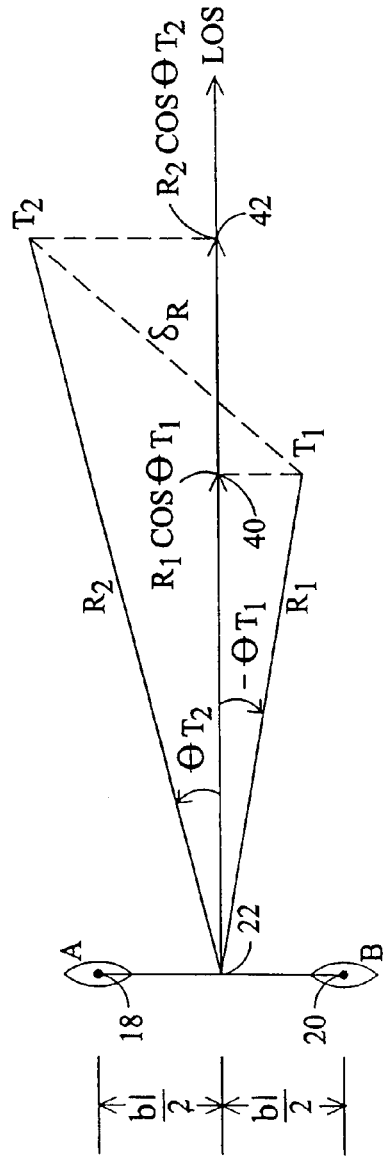
FIG. 9 is a schematic illustration depicting the angular relationships used for generating velocity vector components and approximations.
Figure 10:
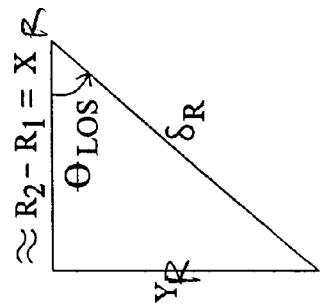
FIG. 10 is a simplified schematic illustration depicting the angular relationships used for generating velocity vector components and approximations.

As shown in FIGS. 9 and 10, the x component parallel to the LOS, $X_R$, is defined as the difference of the two range measurements $R_1$ (the distance between the baseline midpoint 22 and the target $T_1$ at first instance $t_1$) and $R_2$ (the distance between the baseline midpoint 22 and the target $T_2$ at second instance $t_2$). The difference between the two range measurements can be approximately defined by the equation: $X_R$=$R_2$-$R_1$. This is an approximation, since the actual difference of the two range measurements is defined by the equation: $R_2 \cos\theta T_2 - R_1 \cos\theta T_1$. $R_1 \cos\theta T_1$ is the distance on the LOS from the baseline midpoint 22 to point 40, the perpendicular distance from $T_1$ to the LOS. $R_2 \cos\theta T_2$ is the distance on the LOS from the baseline midpoint 22 to point 42, the perpendicular distance from $T_2$ to the LOS. However, $\theta T_2$ (the angle between LOS and $R_2$) and $\theta T_1$ (the angle between LOS and $R_1$) cannot be determined. The $X_R=R_2-R_1$ approximation will produce accurate results when $\theta T_1$ and $\theta T_2$ are both small. $V_X$, the x component of the velocity vector, is then determined as $V_X=X_R/(t_1-t_2)$.

The y component of the velocity vector, $Y_R$, also known as a "cross-track" velocity component, is then solved using the relationship set forth in FIG. 10. Using $\delta R$ (as computed above) as the hypotenuse and $X_R$ (as computed above) as one leg of the relationship triangle of FIG. 10, the triangle shown in FIG. 10 can be solved for the perpendicular displacement component $Y_R$ using Pythagorean theorem: $Y_R=[(\delta_R)^2-X_R^2]^{1/2}$. The y component of the velocity, $V_Y$, is then $V_Y=Y_R/t_2-t_1$. The angle between the velocity vector and the LOS can then be calculated by the following equation: $\theta_{LOS}=\arctan Y_R/X_R$. Knowledge of the angle $\theta LOS$ is of value in applications where it is desirable to move the system line-of-sight to track the target or simply to keep the target in the field of view.

Figure 11:
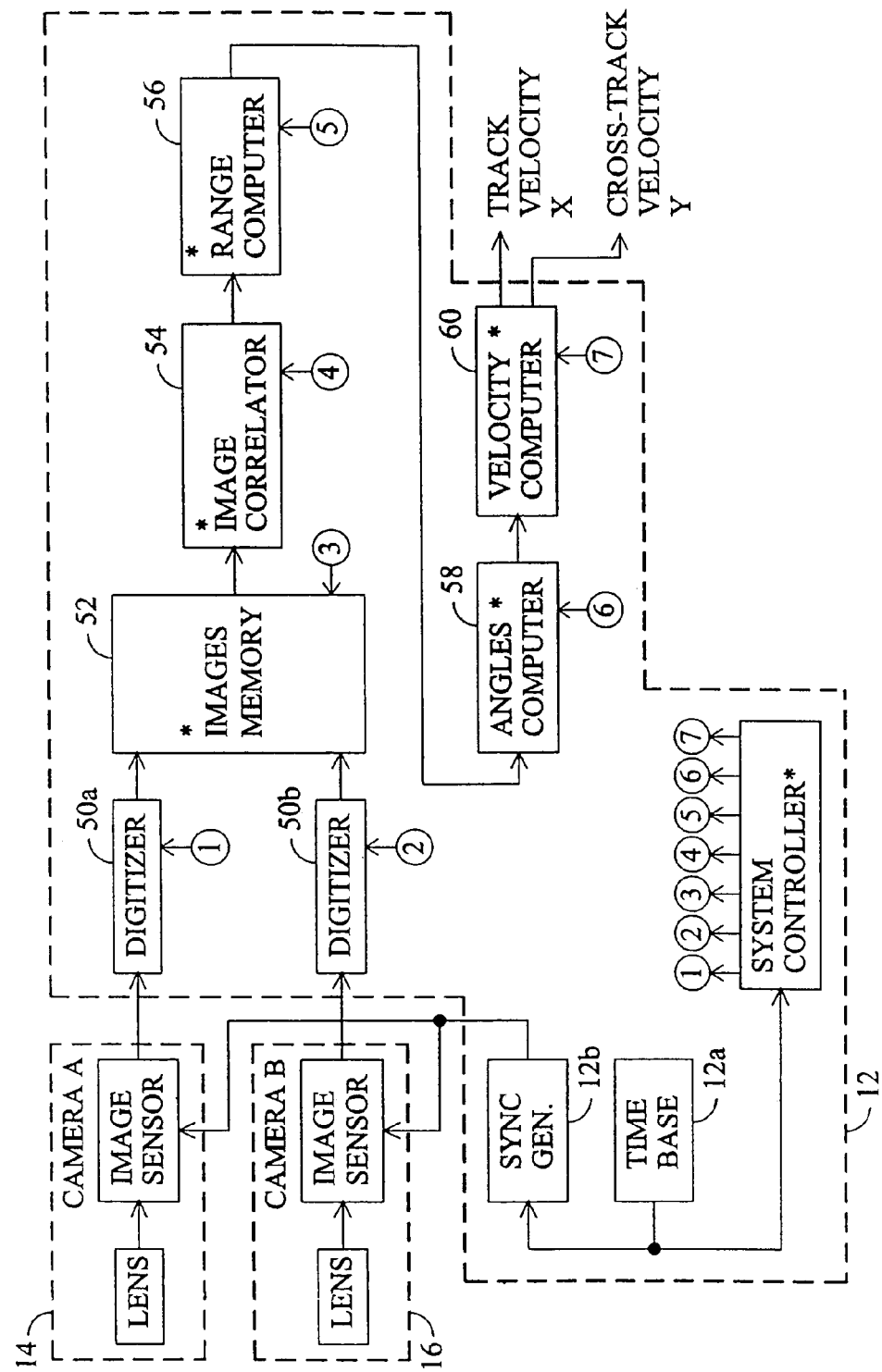
FIG. 11 is a simplified block schematic diagram of the system of the invention.

FIG. 11 shows an exemplary functional block diagram of one possible implementation of the velocity measuring system of the present invention. Camera or sensor A 14 and camera or sensor B 16 are electronic imaging cameras substantially controlled by the system controller 12. The time base 12a and sync generator 12b are used to synchronize the cameras. Further, the time base 12a provides the time interval measurement capability that allows calculation of t1 and t2. The time between image acquisitions may be determined by keeping count of the number of camera images that have been scanned between image acquisitions. The digitizers 50a, 50b convert the analog camera outputs to a digital format, enabling the camera images (or portions thereof) to be stored in conventional computer-type memory 52.

The image correlator 54 correlates the images supplied by camera A 14 and camera B 16. The correlation process is used to determine the angular difference between cameras when sighting an object or target T at the same time ("correlation") or at two different times ("cross-correlation").

The range computer 56 then determines the range R to the target T by triangulation using the measured angular difference acquired by the cameras at the same time.

The angles computer 58 uses both the range and angle measurements to compute the components of displacement of the target T parallel and perpendicular to the system LOS.

The velocity computer 60 uses the measured displacement components and knowledge of the time between measurements $(t_2-t_1)$ to compute velocity V and its components, $V_X$ and $V_Y$.

The system controller 12 sequences and manages measurement and computation. The image correlator 54, range computer 56, angles computer 58, velocity computer 60, and system controller 12 can be implemented as hard-wired electronic circuits, or these functions can be performed by a general-purposed digital computer with special software.

Although the invention has been described with reference to detection systems for detecting the range and total velocity of a general moving target it should be understood that the invention described herein has much broader application, and in fact may be used to detect the range to a stationary object, the total velocity of any moving object and/or relative motion between moving or stationary objects. For example, the invention may be incorporated into a range and velocity detection system for moving vehicles. Another example is that the invention may be incorporated in a robotics manufacturing or monitoring system for monitoring or operating upon objects moving along an assembly line. Still another important application is a ranging device used in conjunction with a weapons system for acquiring and tracking a target. Yet another application is a spotting system used to detect camouflaged objects that may be in motion against a static background. Other possible uses and applications will be apparent to those skilled in the art.

Figure 12:
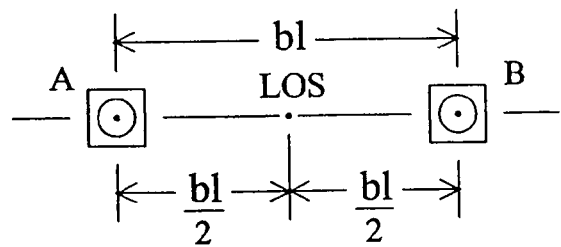
FIG. 12 is a simplified schematic illustration of a two-camera system of the present invention.
Figure 13:
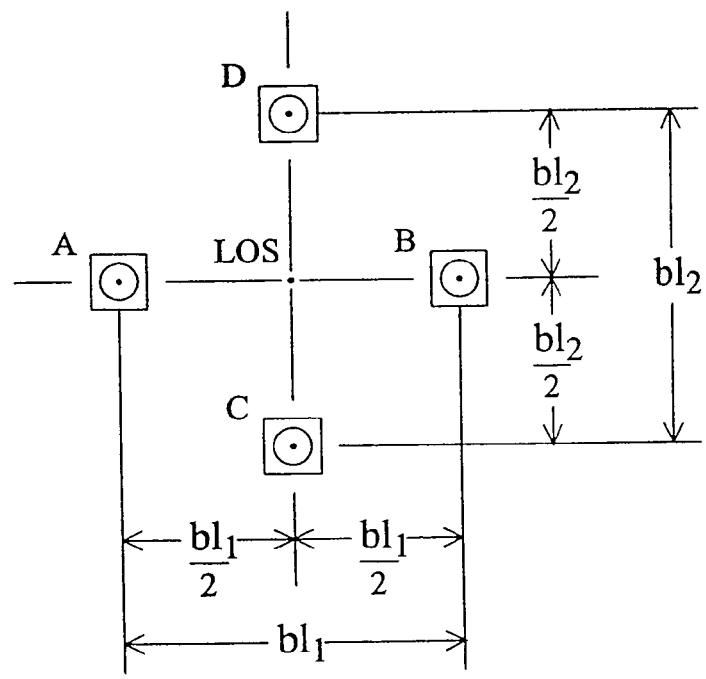
FIG. 13 is a simplified schematic illustration of a four-camera system of the present invention.
Figure 14:
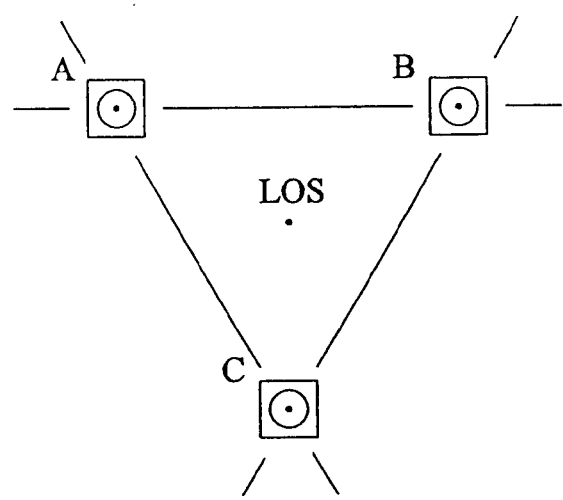
FIG. 14 is a simplified schematic illustration of a three-camera system of the present invention.
Figure 15:
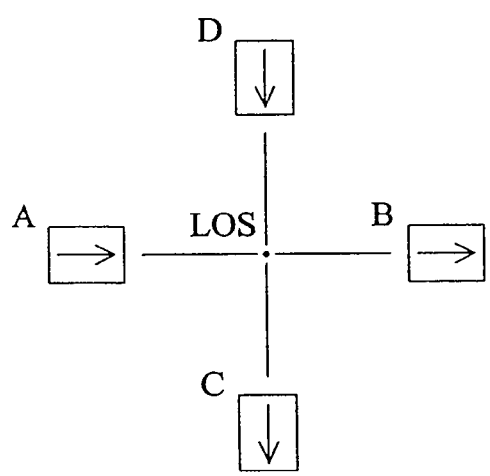
FIG. 15 is a depiction of the video scan lines orientation of the four-camera system of FIG. 13.

The foregoing invention can also be adapted to measure velocity in three-dimensional space. To do this a two-dimensional camera configuration, such as that shown in FIG. 12, is adapted to either the configuration shown in FIG. 13 or FIG. 14. The embodiment shown in FIG. 13 uses four cameras, A, B, C, and D centered around a central LOS (extending outward form the page). The baseline b11 defined between cameras A and B is perpendicular to baseline b12 defined between cameras C and D, although b11 and b12 need not be the same length. FIG. 15 shows the video scan lines orientation for this system in which cameras A and B operate as one subsystem and cameras C and D operate as a second subsystem that is a duplicate of the camera A and B subsystem, except for its orientation. The velocity vectors produced by the two subsystems are summed (vector summation) to yield the total target velocity in three dimensions. FIG. 14 shows an alternate configuration that can measure velocity in three-dimensions, but uses only three cameras A, B, and C. It should be noted that the FOV is smaller than that of the four camera system of FIG. 13 and the calculations to determine the velocity are more complex.

The velocity measuring system of the preferred embodiment can be adapted as an intrusion detection system. Although many intrusion detection systems use video surveillance cameras as monitors, attempts to make such systems automatic are problematic. Passive optical systems "see" everything and are therefore triggered by numerous false alarms. Falling objects, birds, animals and other objects which are not of interest are detected by such systems in the same way that intruders are. In the simplest system of this type, a video camera scans an area and continuously compares a scan of the pixels of a light-sensitive device with a previous scan. When the pixel maps are compared, any difference between a present scan and previous scan means that an object has moved into the field of view and thus, an alarm is triggered.

Figure 16:
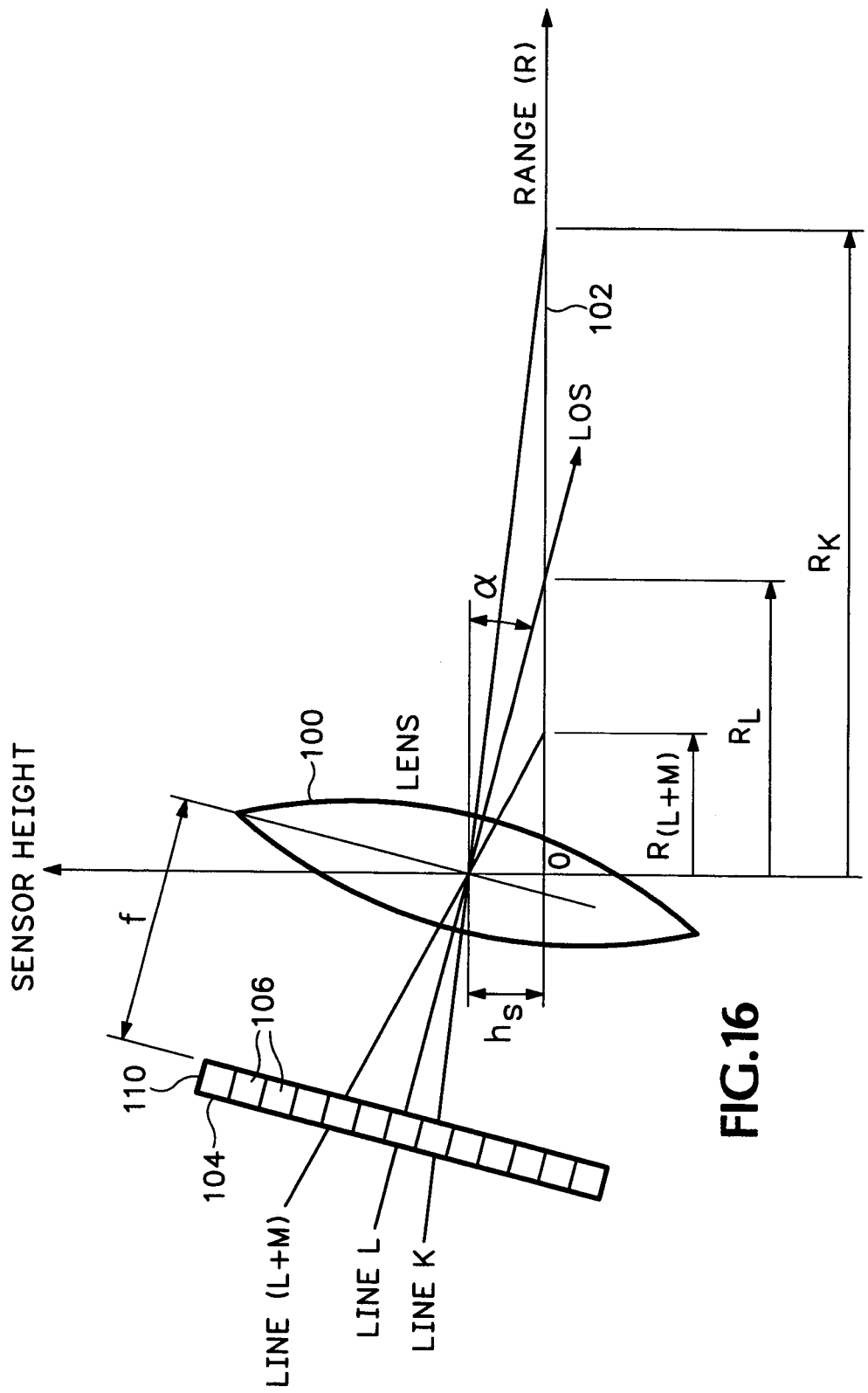
FIG. 16 is a schematic diagram illustrating the geometry of one of the optical detectors used in an intrusion detection system.

In order to prevent false alarms, a passive optical system must be capable of discrimination between objects of interest such as human intruders and other objects. These objects can be detected by discriminating between various objects in the field-of-view of the system on several bases. First, the system may be configured to respond only to objects located at a given range within the area to be monitored. As will be explained below, a range gate may be set so that only objects captured within the range gate are recorded on the system; all other objects are ignored. Discrimination may also occur on the basis of the object's height and its velocity. Because velocity is a vector quantity as explained above, discrimination may also occur on the basis of the algebraic sign of the velocity vector. The system employs the same setup as illustrated in FIG. 1. However for intrusion detection, it is best to mount the system at a height $h_s$ above the ground as shown generally in FIG. 18. Having the system pointed downward at an obtuse angle to ground reference will provide the range gate capability required for object discrimination. A schematic close-up of this configuration is shown in FIG. 16 in which a lens 200 is mounted at a height $h_s$ above a horizontal surface 202 which may be the ground or a floor but is some horizontal reference plane. The lens has a focal length f and a light-sensitive device, such as a charge coupled device or equivalent 204, is placed at the focal length. The light-sensitive device 204 includes a plurality of lines of pixels 206. A pair of lenses such as lens 200, which may be associated with video cameras 14 and 16, are placed at a downward looking angle a predetermined distance apart. Usually, the baseline distance between the two lenses will be parallel to the horizontal surface 202. This is not absolutely necessary as the geometry can be corrected if the baseline between the lenses is not perfectly horizontal. Each lens includes a light-sensitive device 204. This may be a charge coupled device or any similar device having photosensitive elements as described above.

Figure 19:
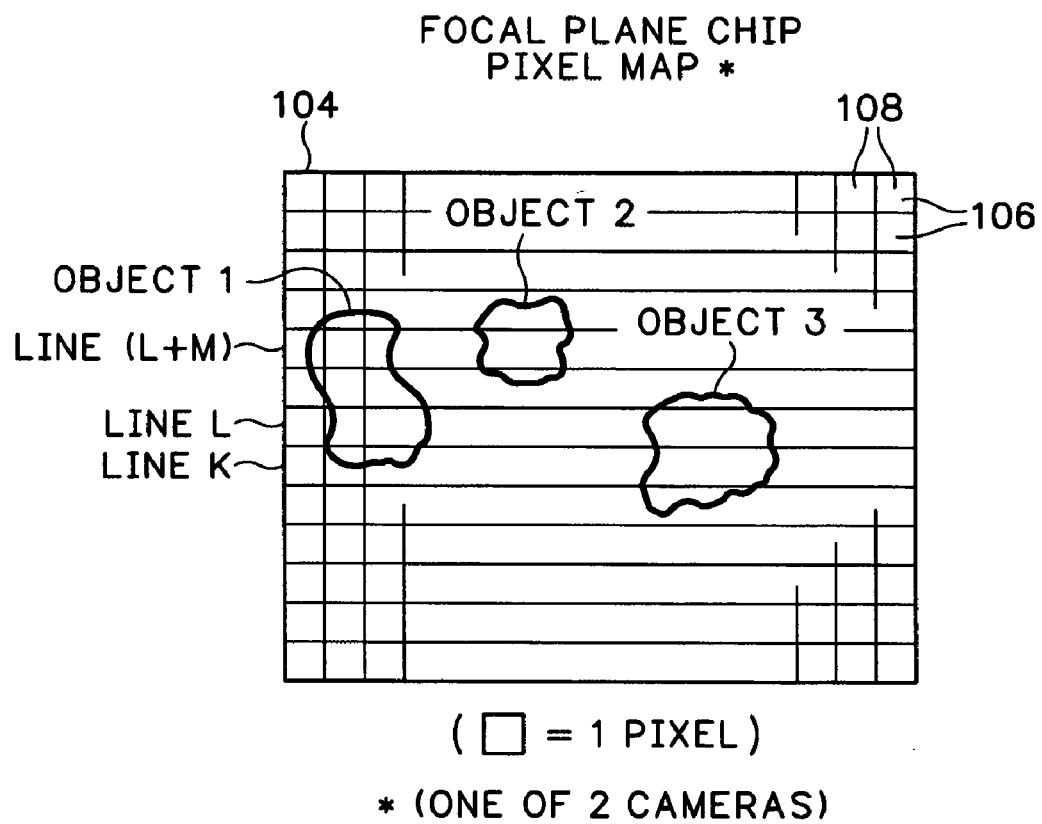
FIG. 19 is a schematic diagram of one of the light-sensitive devices used for each of the lens in the intrusion detection system illustrating how objects are seen by the scanning of selected lines of pixels.

Referring to FIG. 19, the light-sensitive device 204 includes lines 206 comprised of individual pixel elements 208. While FIG. 16 shows the use of a light-sensitive device 204 for each of the lenses represented by lens 200 in FIG. 16, it should be understood that a single light-sensitive device may be used if desired. Light from each of the lenses can be routed to a single light-sensitive device using mirrors and the like. However, simplicity of construction makes it more practical to use a single light-sensitive device for each lens in the dual lens array.

The light-sensitive device, typically a charge-coupled device or a CMOS imager chip, is in the focal plane of the lens; f is the focal length of the lens 200. The light-sensitive device 204 is shown for clarity of illustration as having only a few lines of pixels 206. However, an actual chip of this type would have hundreds of lines. From FIG. 16, it can be seen that for the particular orientation chosen, that is, the angle at which the lens is pointed into the space to be monitored, each line 206 on the chip "sees" out to a different maximum range. For example, line L is sensitive to objects at range $R_L$ but no further. The topmost line of the chip, line 210, would define the minimum range whereas ordinarily the bottom line 212 would define the maximum range. The maximum and minimum ranges are determined by the focal length f of the lens, the height $h_s$ of the system above the ground 202, and the elevation angle α.

Figure 17:
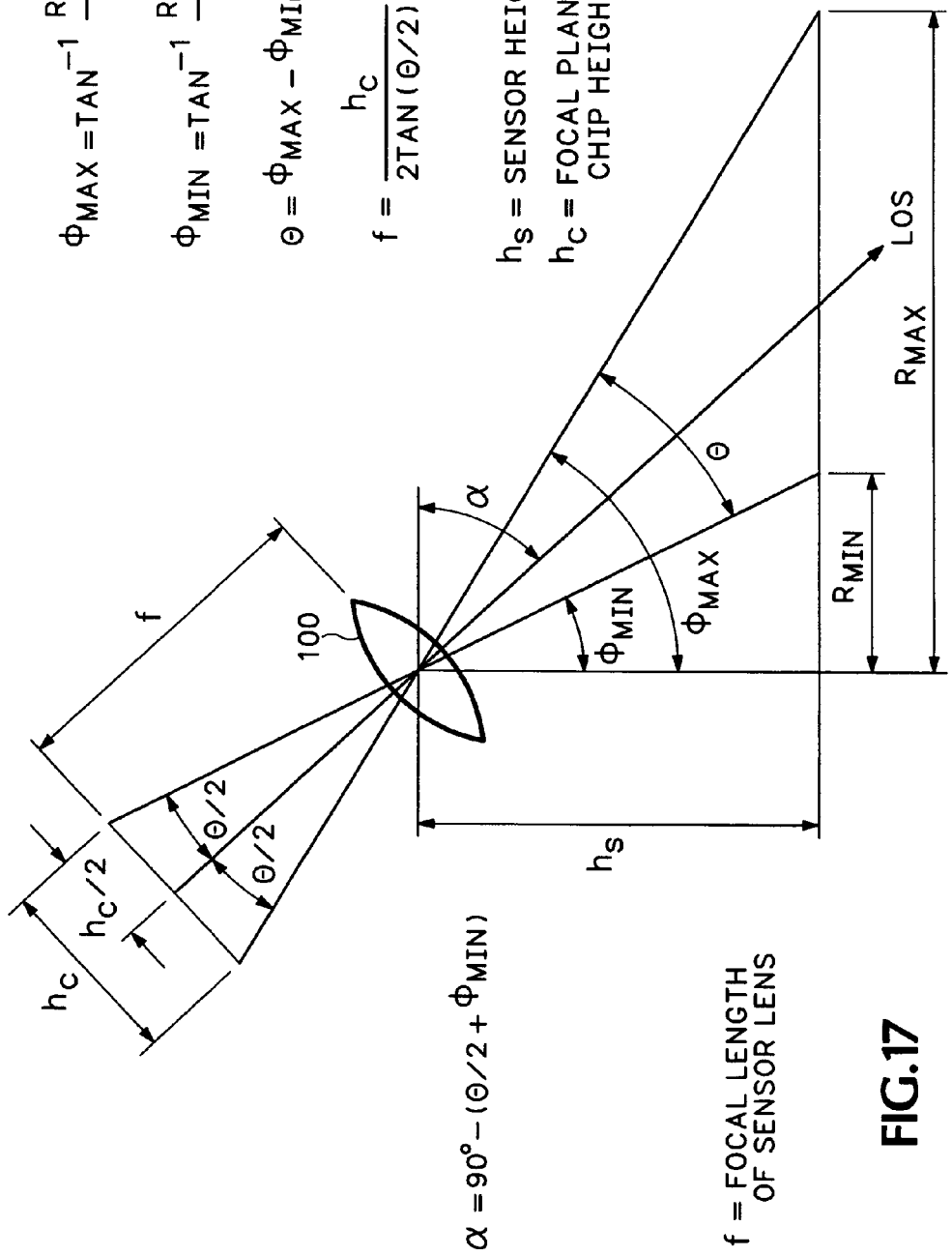
FIG. 17 is a schematic diagram illustrating the geometry of the intrusion detection system of FIG. 16.
Figure 18:
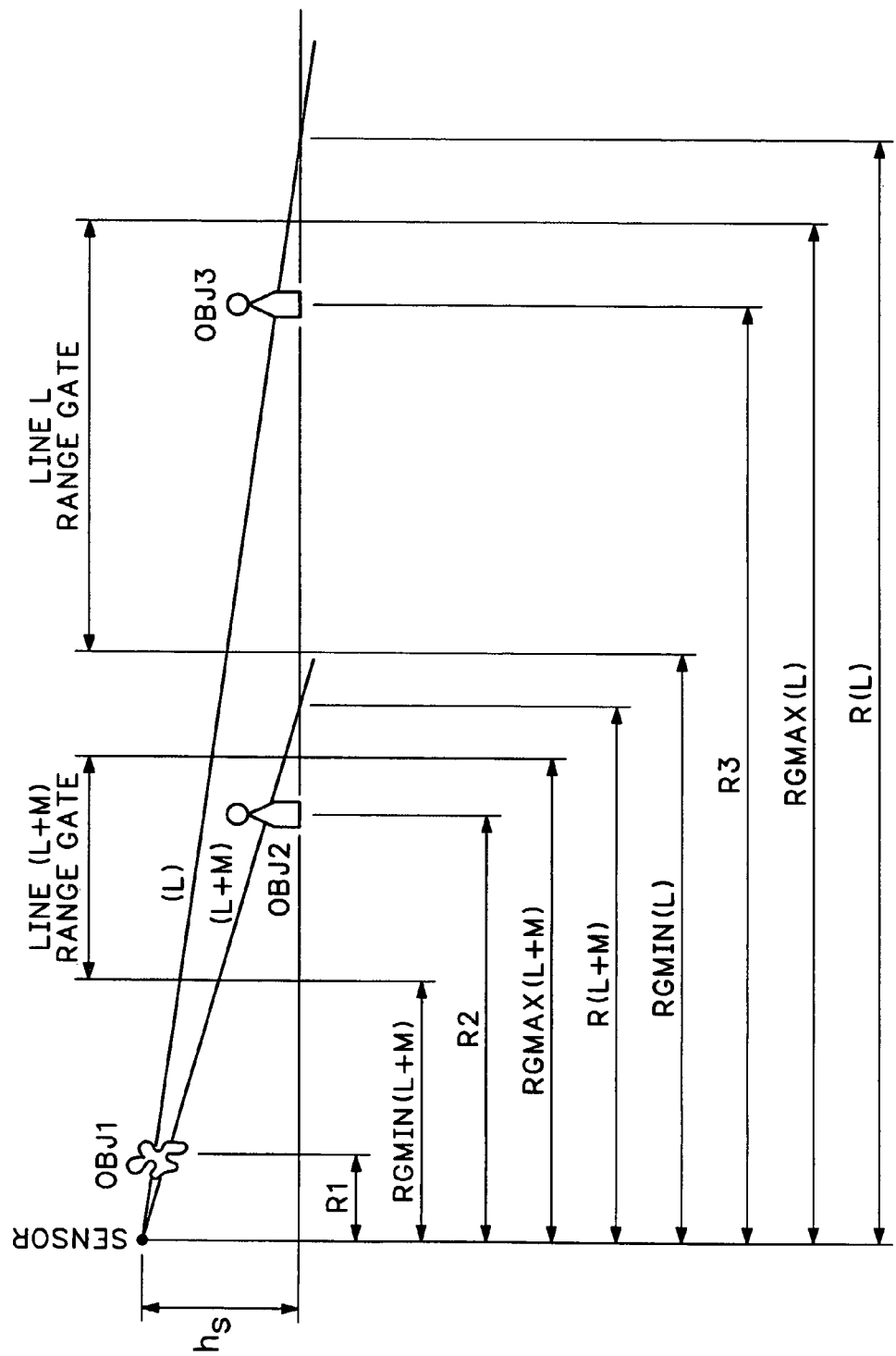
FIG. 18 is a schematic diagram illustrating the range gate feature of the intrusion detection system.

Referring to FIG. 17, the system is set up by selecting the desired maximum range Rmax and the minimum range Rmin and the sensor height $h_s$. Once this is done, the angles Φmax and Φmin can be calculated and the field-of-view angle (angle θ) may then be determined. The elevation angle a to which the system must be set can then be computed as a function of θ and Φmin. Once this is done, the only remaining task is to compute the focal length necessary for the lens. This focal length is a function of θ and the focal plane imager chip height $h_c$. The five necessary equations for solving for the focal length f are as follows:

Φmax=arctan (Rmax/$h_s$);      Eq. 1:

Φmin=arctan (Rmin/$h_{Ss}$);.      Eq. 2:

Θ=Φmax−Φmin;      Eq. 3:

α=90 deg.−(Θ/2)−Φmin;      Eq. 4:

f=$h_c$/[2 tan (Θ/2)]      Eq. 5:

One mode of the intrusion sensing operation is shown in FIG. 18. FIG. 18 shows how the use of a range gate enables a system to discriminate between objects of interest and false alarms. A range span within which objects will be detected by correlation of a specific video line pair can be established by the control and computational subsystem of FIG. 11. The maximum range in the span cannot be greater than the maximum range that the specific line can "see." However, it can be less. The minimum range of the range span can be any range less than the maximum. Once this span or "range gate" is set, the video line pair correlation is restricted to this span of distance within the area to be monitored. In FIG. 18, two range gates are shown, one for video line pair L and one for line pair L+m.

Line L can see both object 1 and object 3 but only object 3 is within the line L range gate. Line L+M can also see object 1. In addition, line L+M can see object 2 but only object 2 is in the line L+M range gate. Thus, if object 1 were an object blown by the wind or a bird, it would be seen by many of the video lines in the light-sensitive device but it would not cause a false alarm because the range, when calculated, falls outside the parameters for the range gate of either line L or line L+M. The way in which the objects 1, 2 and 3 might be seen by the light-sensitive device 204 is illustrated in FIG. 19. It should be noted that in order to perform object detection within a predetermined range gate, line pair correlation is performed for only a limited plurality of pixel lines 206 of the light-sensitive device 204. In effect, the light-sensitive device may be separated into pixel line "zones" which represent various range gates. Thus within an area to be monitored, range gates may be set at both distant and near ranges as determined by the needs of the user.

Figure 20B:
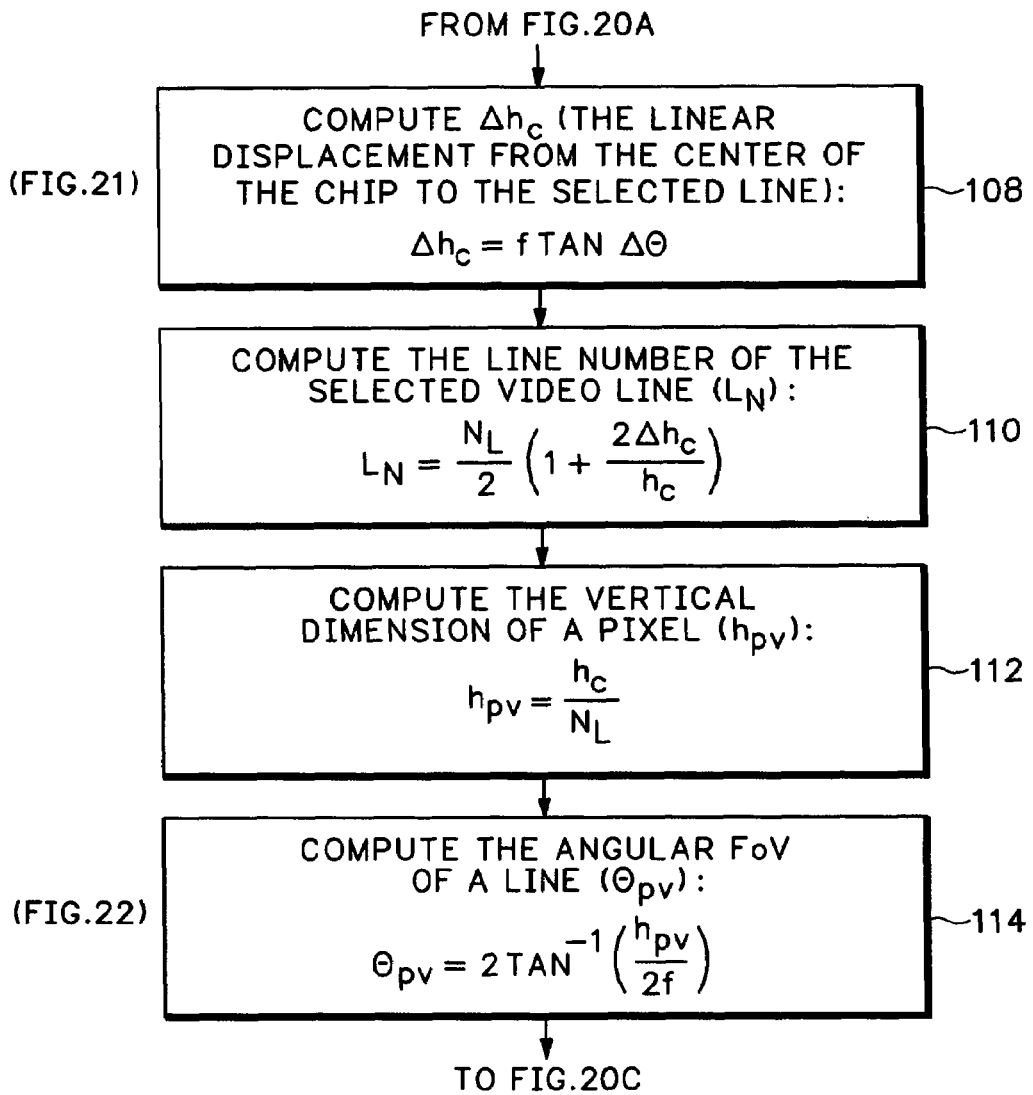
Figure 20C:
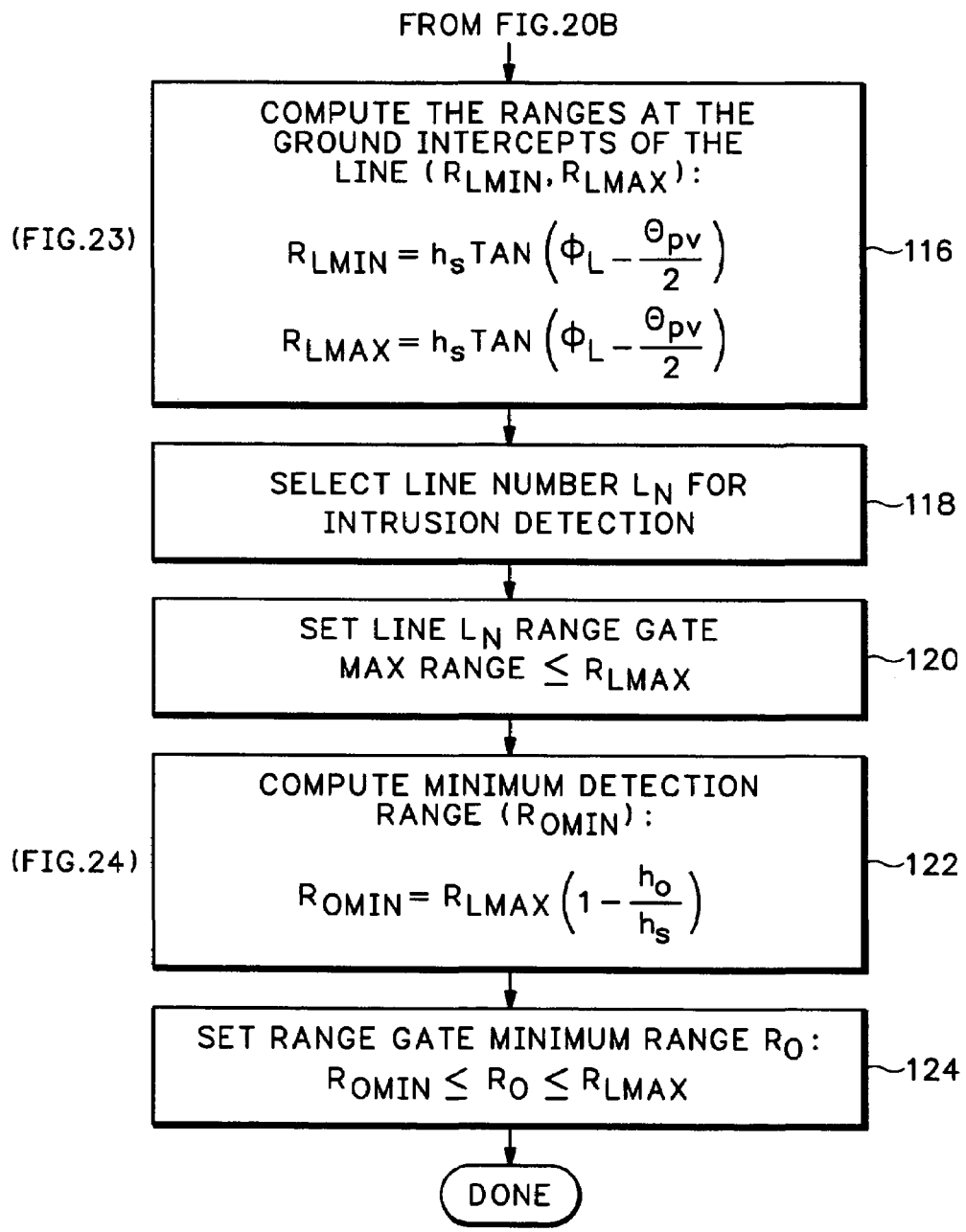
Figure 21:
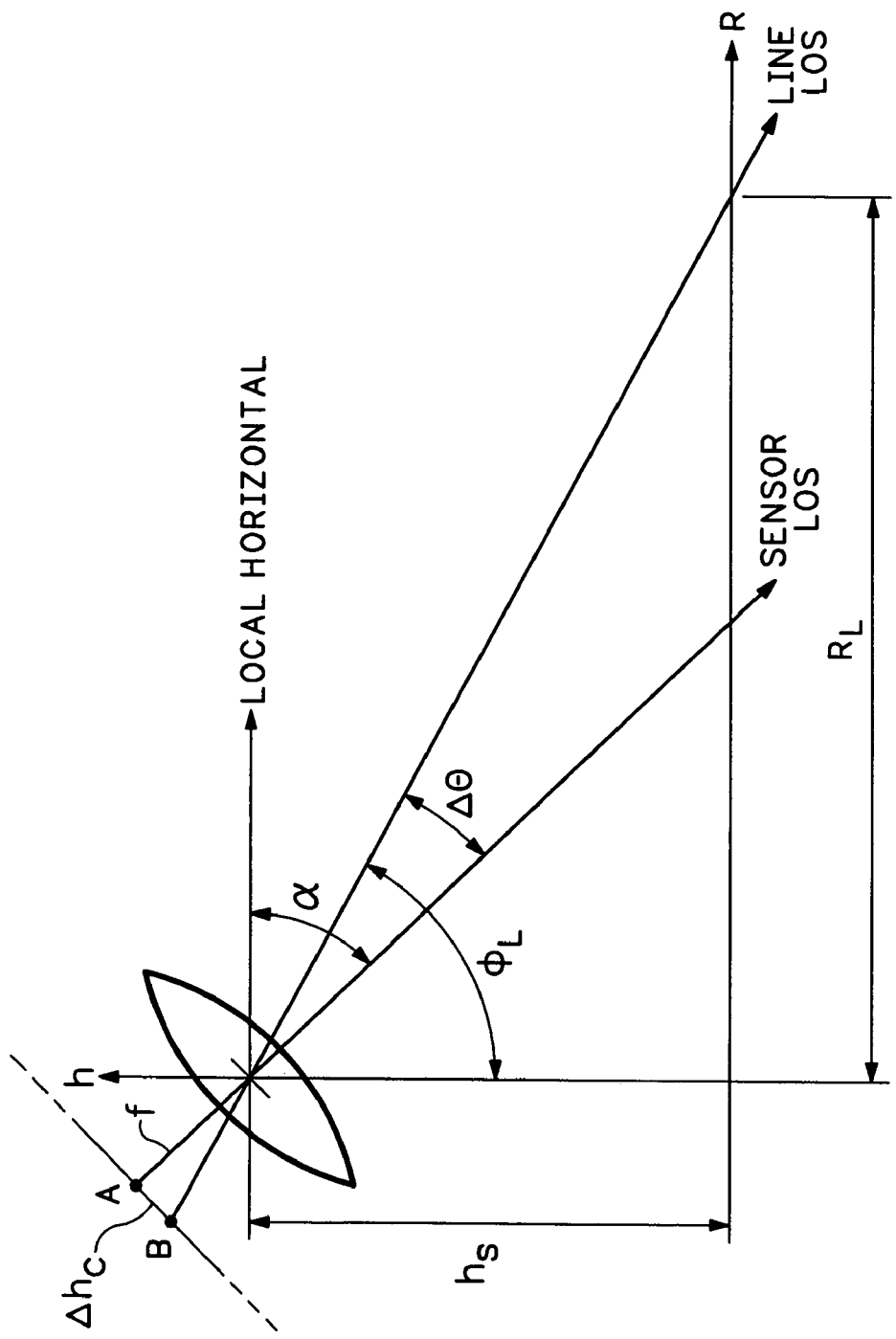
FIGS. 21 is a schematic diagram of a lens and a light-sensitive element illustrating the geometry referred to in FIGS. 20A–20D.
Figure 22:
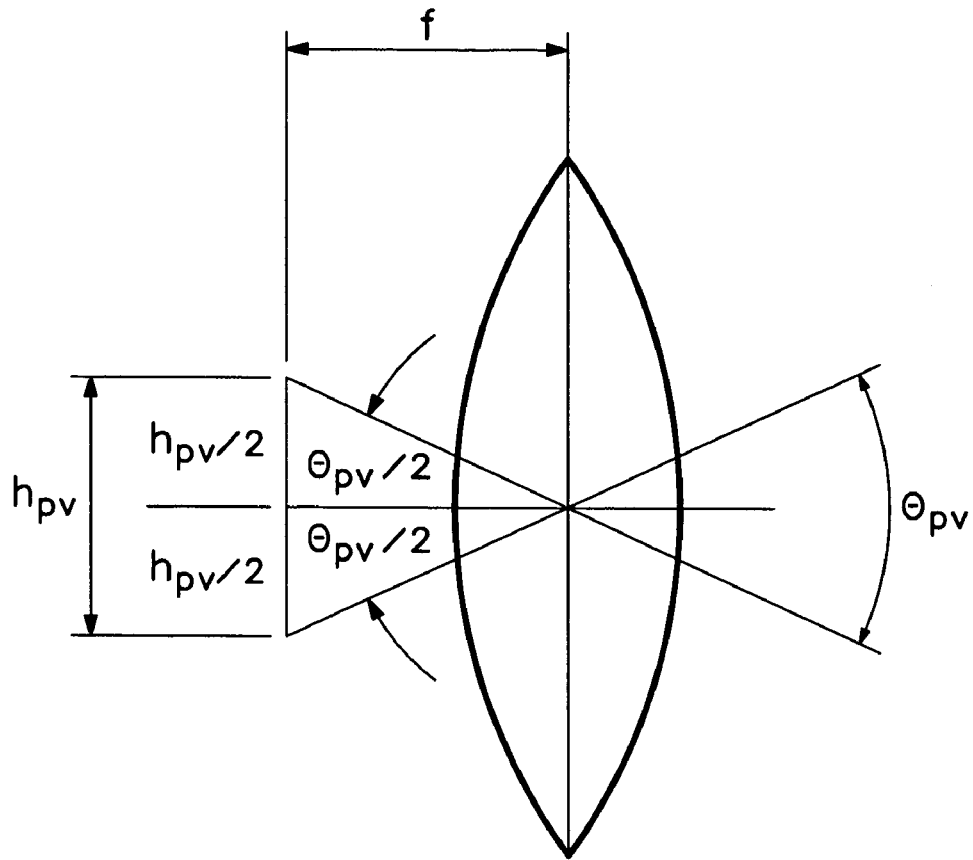
FIG. 22 is a schematic diagram of a lens illustrating the vertical angular field of view of a line of pixels in a light-sensitive device.
Figure 23:
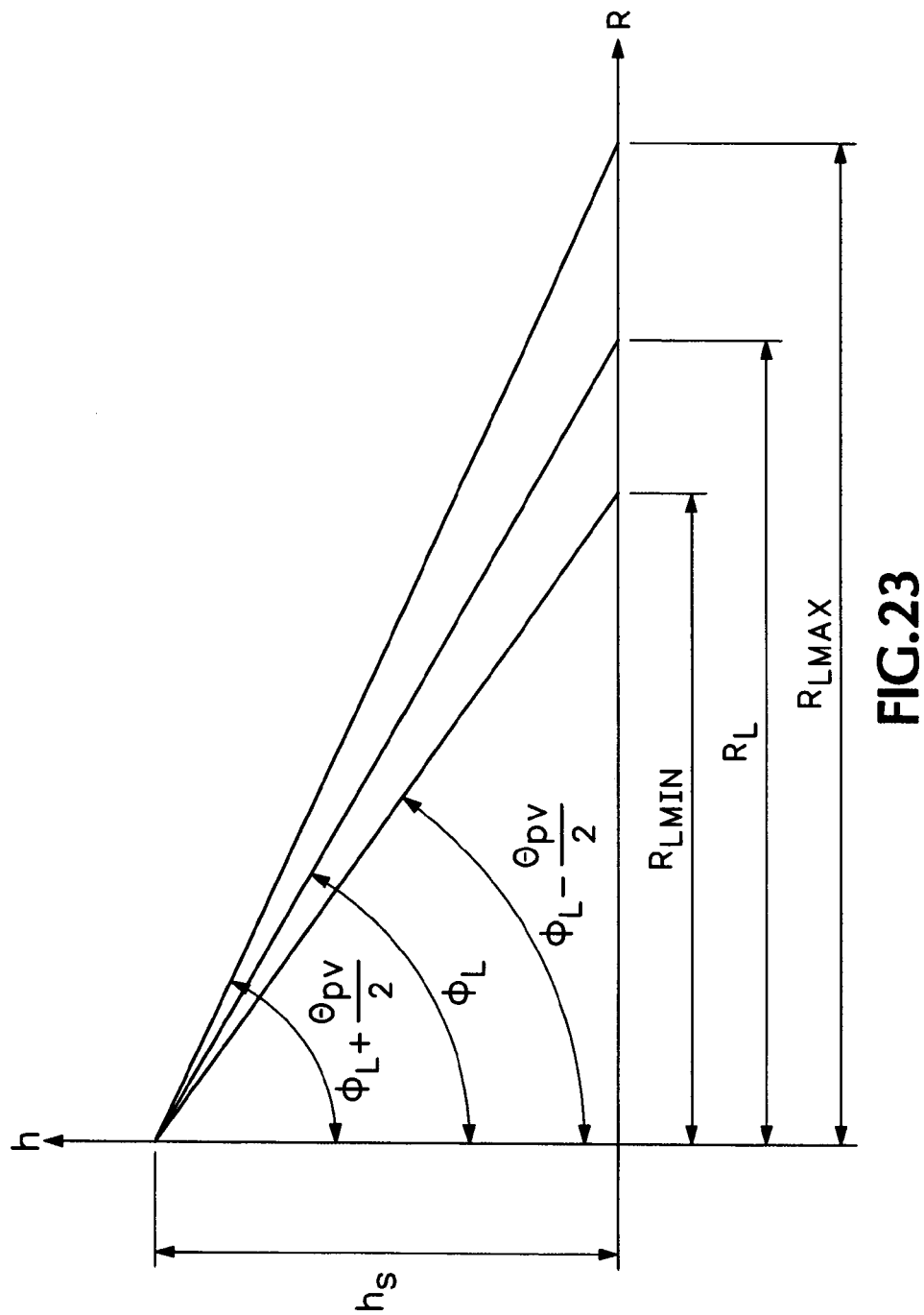
FIG. 23 is a geometrical drawing illustrating the range span of a particular line of pixels in a light-sensitive device.

FIGS. 20A–20C illustrate the method by which the range gate is selected by the system controller of FIG. 11. FIGS. 20A–20C are a flowchart diagram that illustrates how the range gate is set. Once the system is installed within an area, a number of parameters must be set. These parameters may be measured and entered into the system through a computer keyboard. At block 200, object height, sensor height, focal length, sensor depression angle, the video camera chip vertical active dimension and the number of the video lines in the chip are all entered into the system. Next, a nominal maximum range is selected at block 302. This range will depend upon the dimensions of the area to be monitored. At block 304, the angle $\Phi_L$ is computed, which is the angle between video line-of-sight and a local vertical reference (which is 90° to local horizontal). At block 306, the angle is computed between the sensor line-of-sight and the line-of-sight that will be seen by a pixel line at the maximum range. Note that the identity of this pixel line is not yet known; it will be computed. Next, the linear distance or displacement from the center of the chip to the line which sees out to the maximum range is computed in block 308. From this computation, the line number can then be computed in block 310. Once the line number is known, the vertical dimension of the pixel can be computed as shown in block 312. From this information, the angular field of view of any particular line can be determined in block 314. Referring to FIG. 20C, now the ranges at the horizontal reference intercepts of any particular line may be computed. These parameters are shown graphically in FIG. 23. In block 318, the system next selects a line number for intrusion detection and in block 320, with the information previously known for each line number, the maximum dimension of the range gate is set.

Referring to FIG. 24, some assumptions must be made about the size of objects that will be seen by the system when they are found within the distance limits defined by the range gates. In FIG. 24, an object has a height $H_O$. This dimension is then inserted in block 122 into the system so that the minimum range gate distance $R_O$ min may be calculated. Referring to block 124, the range gate minimum can now be set so that the intrusion detection system is configured to see objects that appear between the distances within the area to be monitored between $R_O$ min and $R_L$ max. As an example, given nominal system parameters of $H_S$ as 10 feet (that is the two lenses and light-sensitive elements, preferably in the form of a pair of video cameras are placed 10 feet above the horizontal reference ground at a nominal angle of between one and two degrees pointing downward) with a focal length of a 159 millimeters and a chip height of 0.25 inches with 525 lines of pixels, if the maximum range is set to 500 feet and the object height of interest is set to six feet, the system would use video line number 383 for detection. Line number 383 would see out to a maximum range of about 500 feet and to a minimum distance of about 200 feet. This would then avoid false alarms from objects that are higher than six feet but which occur at a range of less than 200 feet. This is merely an example, however, and the parameters of the system can be set by the user to define a single range gate, or multiple range gates, according to its particular needs.

Figure 25A:
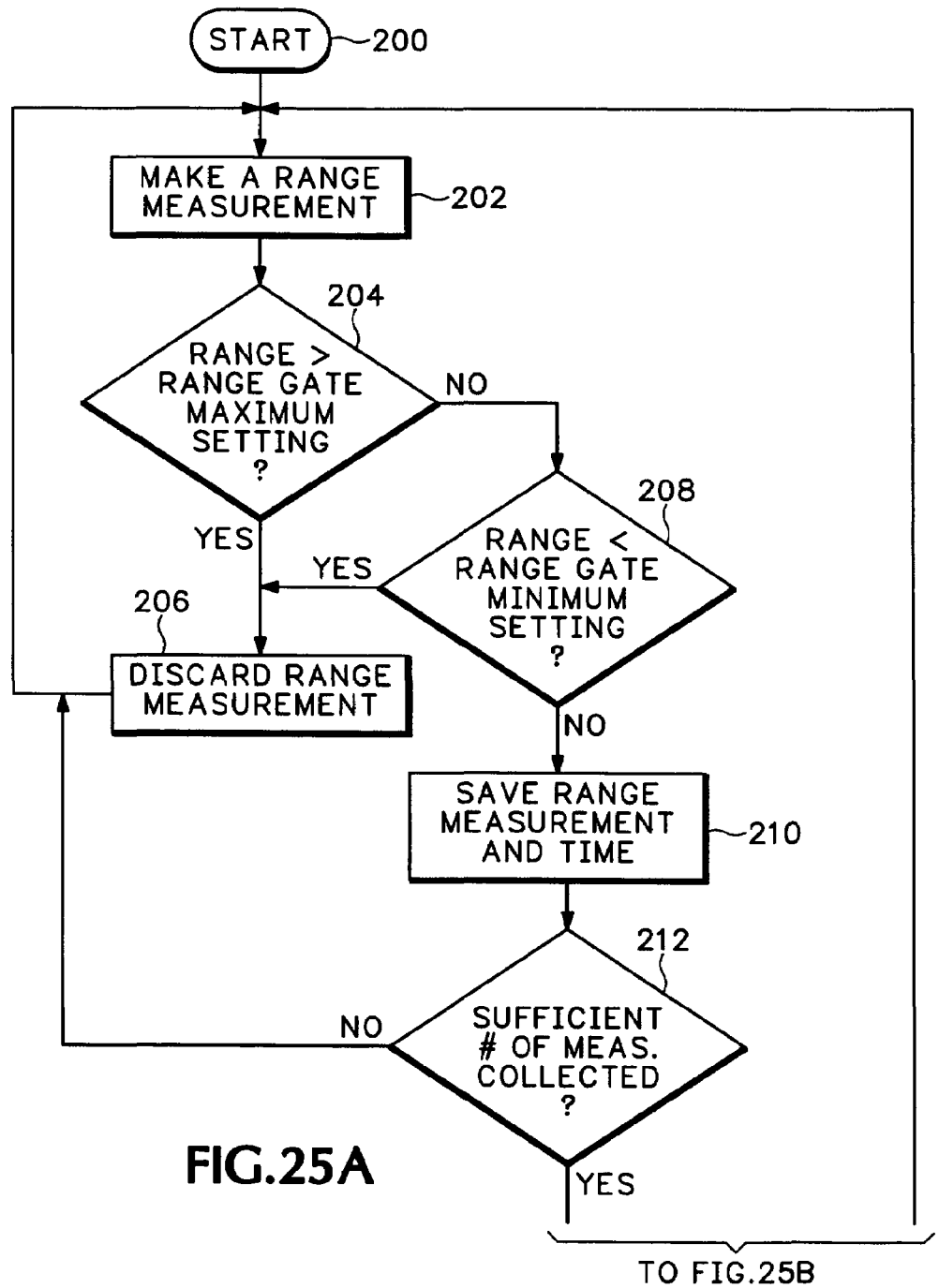
FIGS. 25A, 25B are flow chart diagram illustrating how approaching/receding velocity discrimination is accomplished within a selected range gate.
Figure 25B:
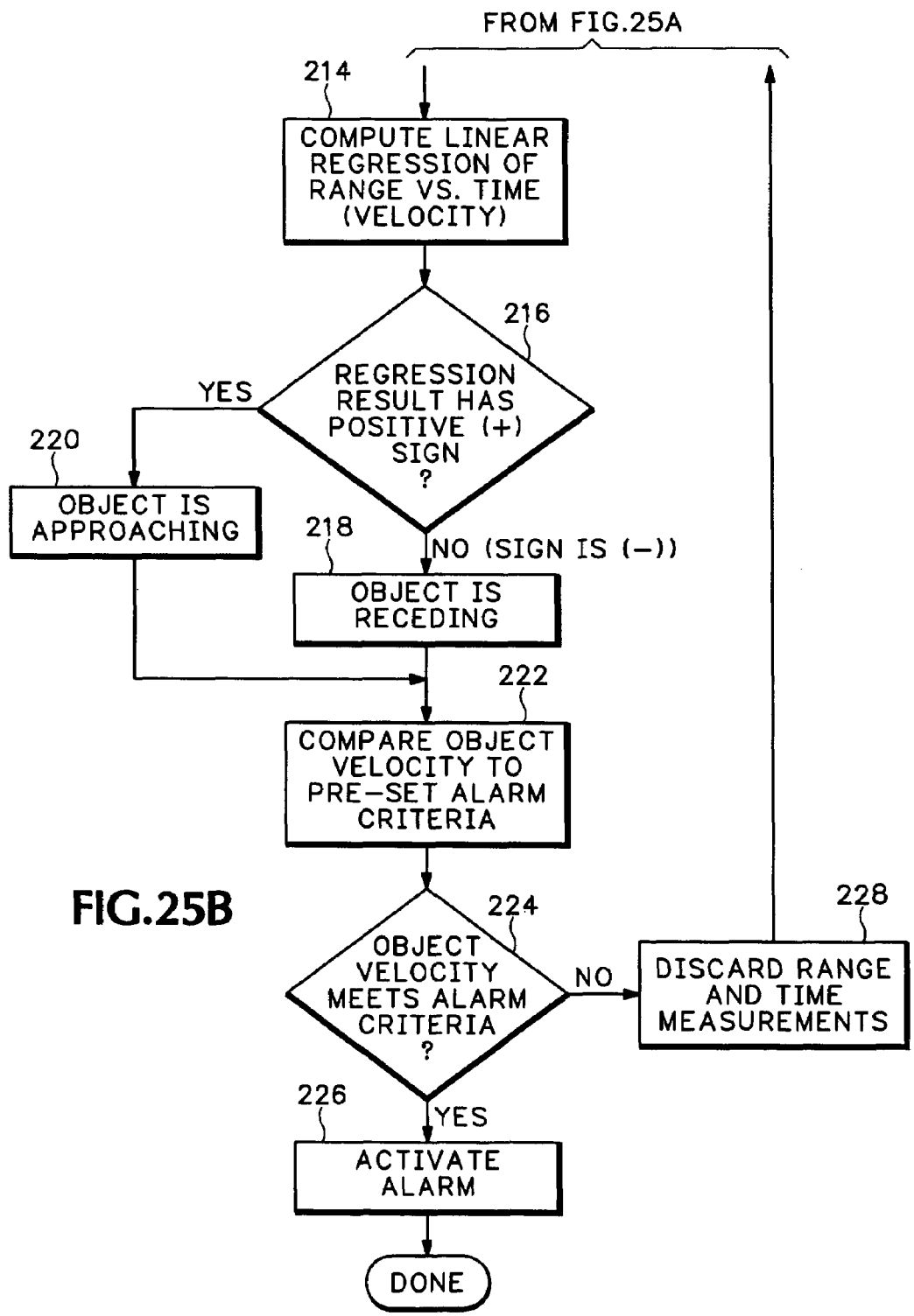

Referring to FIGS. 25A and 25B, a block diagram is shown which illustrates how the system of FIG. 11 operates to detect intruders within a secured area. Referring to FIG. 25A, after power-up and start at block 400, the system makes a range measurement (block 402). If the range detected is greater than the range gate maximum setting (block 404), the range measurement is discarded (block 406). The program loops back and another range measurement is made. If the range is not greater than the maximum setting in block 404, the measurement is compared with the range gate minimum setting (block 408). If the measurement is less than the minimum setting, the measurement is discarded (block 406). If the measurement is not greater than the minimum setting, the measurement is saved and the time is noted (block 410). This process continues until a sufficient number of measurements are collected (block 412). Once a sufficient number of data points have been collected, a linear regression of range versus time is computed (block 414). This computation yields the velocity of an object of interest that is found within the range gate. The system then determines whether the velocity is positive or negative (block 416). If negative, the object is marked as one that is receding (block 418). If positive, the object is approaching as determined in block 420. The system controller of FIG. 11 may contain preset alarm criteria. This provides still further discrimination among objects of potential interest. For example, objects that are moving either too fast (i.e., birds or falling objects) or objects that move too slowly may be eliminated. In block 422, a comparison is made between the objects velocity and preset alarm criteria. If the velocity criteria is met (block 424), an alarm is activated (block 426). On the other hand, if the object velocity does not meet the preset alarm criteria, it may be discarded (block 428).

Thus, the intrusion detection system of the preferred embodiment is able to discriminate among objects not only on the basis of their range but also based upon velocity within a range of interest. Other criteria may be imposed as well. For example, objects approaching (positive velocity vector) at a high velocity might be discarded while objects receding at a similar velocity might be deemed to be of interest, or vice-versa. The user may select parameters based upon the particular environment to be monitored.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An intrusion detection system comprising:
    (a) a pair of optical lenses arranged a predetermined distance apart and at a predetermined height above a ground reference plane and having overlapping fields of view within an area to be monitored to form a common field of view said pair of lenses being tilted in a downward direction towards said ground reference plane;
    (b) a range discriminator for setting at least one range gate so as to sense objects within said common field of view within predetermined ranges and for ignoring objects that appear outside of said predetermined ranges;
    (c) at least one light-sensitive device responsive to light from each of the optical lenses wherein the said at least one light-sensitive devices includes light-sensitive elements arranged in lines of pixels operably selected by the range discriminator to define the ranges included within the range gate; and
    (d) a range detector responsive to signals from said light-sensitive device operable to determine a range to an object within said common field of view and within said predetermined ranges.

2. The intrusion detection system of claim 1 wherein multiple sets of lines of pixels are operably selected by the range discriminator to provide multiple range gates for the selective detection of objects within said common field of view.

3. The intrusion detection system of claim 2 further including a velocity detector responsive to signals from said light-sensitive device and operable to determine velocity of an object sensed by said range detector within the ranges spanned by said range gates.

4. An intrusion detection system for monitoring a secure area comprising:
    (a) a pair of electro-optical devices arranged a predetermined distance apart and at a predetermined height above a ground reference plane, said devices being tilted in a downward direction and having a common field of view in the secure area to be monitored, each electro-optical device comprising a lens and a light-sensitive element, each light-sensitive element having a pixel array of multiple lines of pixels; and
    (b) a data processing device responsive to the light-sensitive element of each electro-optical device, the data processing device having a range detector to detect the presence of objects in the area to be monitored and the range to each of said objects, said data processing device including a range gate selector for creating multiple zones of ranges within said secure area to be monitored by selecting predetermined ones of said multiple lines of pixels in each said respective pixel array, and extracting image data therefrom.

5. The intrusion detection system of claim 4 wherein said data processing device further includes a velocity detector for determining velocity of objects detected by said range detector.

6. The intrusion detection system of claim 4 further including a light-sensitive device for each lens.

7. The intrusion detection system of claim 4 wherein said multiple lines of pixels are operably selected by the range discriminator to provide multiple range gates for the selective detection of objects within said common field of view.

8. The intrusion detection system of claim 7 further including a velocity detector responsive to signals from a light-sensitive device and operable to determine velocity of an object sensed by said range detector within the ranges spanned by said range gates.

9. An intrusion detection system for monitoring a secured area comprising:
 (a) a pair of passive electro-optical sensors, each sensor including a lens and a light-sensitive device having rows of electronically scanned pixel elements, each row of pixel elements being responsive to light from objects appearing within said area at respective ranges, said pair of sensors being mounted a predetermined distance apart and aimed downward into said secured area at an angle obtuse to a horizontal reference line; and
 (b) a data processing module coupled to the light-sensitive devices and having a range gate selector for selecting predetermined lines of pixels for processing scanned image data from objects appearing at predetermined ranges to determine a range to each of said objects appearing within said secure area at ranges defined by said range gate selector.

10. The intrusion detection system of claim 9 wherein said range gate selector is operable to create multiple zones of ranges within said secure area to be monitored.

11. The intrusion detection system of claim 9 wherein said data processing device further includes a velocity detector for determining the velocity of objects detected by said range detector.

* * * * *